US009774137B2

(12) United States Patent
Park et al.

(10) Patent No.: US 9,774,137 B2
(45) Date of Patent: Sep. 26, 2017

(54) MOBILE TERMINAL

(71) Applicant: LG ELECTRONICS INC., Seoul (KR)

(72) Inventors: Minho Park, Seoul (KR); Hoseok Chung, Seoul (KR); Yongho Lee, Seoul (KR); Sangchul Lee, Seoul (KR); Sungpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/158,350

(22) Filed: May 18, 2016

(65) Prior Publication Data
US 2017/0194739 A1 Jul. 6, 2017

(30) Foreign Application Priority Data

Dec. 30, 2015 (KR) ........................ 10 2015 0190410

(51) Int. Cl.
*H01R 13/60* (2006.01)
*H01R 13/62* (2006.01)
*H01R 13/66* (2006.01)

(52) U.S. Cl.
CPC ..... *H01R 13/6205* (2013.01); *H01R 13/6675* (2013.01); *H01R 13/6683* (2013.01)

(58) Field of Classification Search
CPC H01R 13/6205; H01R 13/2421; H01R 13/64; H01R 11/30; H01R 31/06
USPC ...................................................... 439/39, 40
See application file for complete search history.

(56) References Cited

U.S. PATENT DOCUMENTS

| 6,527,570 | B1* | 3/2003 | Hartman | H01R 13/6205 439/180 |
| 6,840,919 | B1* | 1/2005 | Håkansson | A61M 39/0247 439/39 |
| 7,097,461 | B2* | 8/2006 | Neidlein | H01R 13/6205 439/39 |
| 7,311,526 | B2* | 12/2007 | Rohrbach | H01R 13/6205 439/218 |
| 7,351,066 | B2* | 4/2008 | DiFonzo | H01R 13/641 439/39 |

(Continued)

FOREIGN PATENT DOCUMENTS

DE 19512335 C1 6/1996
EP 2667459 A1 11/2013

*Primary Examiner* — Abdullah Riyami
*Assistant Examiner* — Vladimir Imas
(74) *Attorney, Agent, or Firm* — Birch, Stewart, Kolasch & Birch, LLP

(57) ABSTRACT

A mobile terminal according to the present invention may include a terminal body having a socket, a connector having a coupling portion capable of being coupled to the socket, and a moving module capable of moving the coupling portion to be drawn out of or inserted into the connector through an opening formed at the connector. The moving module may include an elastic member disposed within the connector and capable of applying an elastic force to the connecting portion in a direction that the connecting portion is inserted into the connector, a first magnetic member coupled to the terminal body, and a second magnetic member coupled to the coupling portion and capable of generating a magnetic force with the first magnetic member, so as to apply a force to the coupling portion in a direction that the coupling portion is drawn out of the connector.

21 Claims, 23 Drawing Sheets

(56) References Cited

U.S. PATENT DOCUMENTS

| | | | | |
|---|---|---|---|---|
| 7,445,452 B1* | 11/2008 | Wu | H01R 13/6205 | 439/39 |
| 7,497,693 B1* | 3/2009 | Wu | H01R 13/2442 | 439/39 |
| 7,558,899 B2* | 7/2009 | Yip | G06F 3/0626 | 710/300 |
| 7,625,212 B2* | 12/2009 | Du | H01R 13/6205 | 439/39 |
| 7,625,213 B1* | 12/2009 | Tse | H01R 13/6205 | 439/22 |
| 8,388,353 B2* | 3/2013 | Kiani | H01R 11/30 | 439/39 |
| 8,398,409 B2* | 3/2013 | Schmidt | H01R 11/30 | 439/39 |
| 8,465,296 B1* | 6/2013 | Lin | H01R 13/62 | 439/39 |
| 8,512,048 B2* | 8/2013 | Yasuoka | H01R 13/447 | 439/39 |
| 8,672,228 B1* | 3/2014 | Saini | H01R 11/30 | 235/486 |
| 8,770,986 B2* | 7/2014 | Furness | H01R 13/6205 | 439/39 |
| 8,790,120 B2* | 7/2014 | Wang | H01R 13/6205 | 439/39 |
| 8,944,826 B1* | 2/2015 | Wilkolaski | H01R 13/6205 | 439/39 |
| 9,004,930 B2* | 4/2015 | Gualino | H01R 13/2421 | 439/136 |
| 9,136,642 B1* | 9/2015 | Lin | H01R 31/06 | |
| 9,196,979 B2* | 11/2015 | Kim | H01R 13/24 | |
| 9,262,006 B2* | 2/2016 | Shim | G06F 3/0416 | |
| 9,431,182 B2* | 8/2016 | Kim | H01R 13/7038 | |
| 9,513,702 B2* | 12/2016 | Cho | G06F 3/013 | |
| 9,529,387 B2* | 12/2016 | Carnevali | G06F 1/1628 | |
| 2013/0295781 A1 | 11/2013 | Gualino et al. | | |
| 2015/0093921 A1* | 4/2015 | Lewin | H01R 13/523 | 439/39 |

* cited by examiner (a)

(b)

(a)

(b)

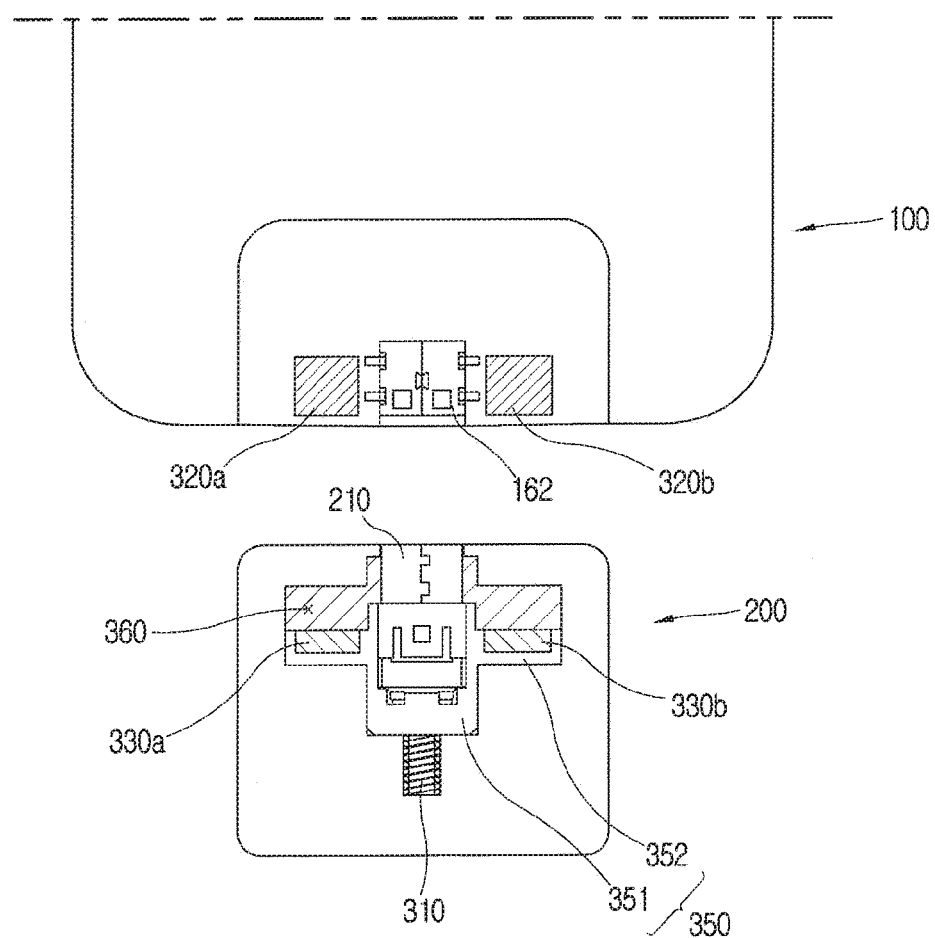

MOBILE TERMINAL

CROSS-REFERENCE TO RELATED APPLICATION

Pursuant to 35 U.S.C. §119(a), this application claims the benefit of earlier filing date and right of priority to Korean Application No. 10-2015-0190410, filed on Dec. 30, 2015, the contents of which is incorporated by reference herein in its entirety.

BACKGROUND OF THE INVENTION

1. Field of the Invention

This specification relates to a mobile terminal connectable with a connector.

2. Background of the Invention

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

In recent time, development of external devices which perform various functions in a connected state with the terminal is actively undergoing. As a part of the development, a connector for connecting an external device, which has a different connection standard from the terminal, to the terminal is actively under development.

A connection terminal provided at the related art connector has a structure protruding from the connector. The connection terminal is thusly likely to be abraded or contaminated.

SUMMARY OF THE INVENTION

Therefore, an aspect of the detailed description is to provide a mobile terminal having a structure in which a coupling portion is drawn out of a connector only when the connector is coupled or mounted to a terminal body.

Another aspect of the detailed description is to provide a mobile terminal having a structure in which a connector is automatically coupled to a terminal body when the connector and the terminal body are located adjacent to each other.

To achieve these and other advantages and in accordance with the purpose of this specification, as embodied and broadly described herein, there is provided a mobile terminal, including a terminal body having a socket, a connector having a coupling portion capable of being coupled to the socket, and a moving module capable of moving the coupling portion to be drawn out of or inserted into the connector through an opening formed at the connector. The moving module may include an elastic member disposed in the connector and capable of applying an elastic force to the coupling portion in a direction that the coupling portion is inserted into the connector, a first magnetic member coupled to the terminal body, and a second magnetic member coupled to the coupling portion and capable of generating a magnetic force with the first magnetic member, so as to apply a force to the coupling portion in a direction that the coupling portion is drawn out of the connector.

In an exemplary embodiment disclosed herein, the first and second magnetic members may generate a magnetic force greater than the elastic force, such that the coupling portion is inserted into the socket when the connector is moved to a position adjacent to the socket in a state that the coupling portion is inserted in the connector by the elastic force.

In an exemplary embodiment disclosed herein, the first magnetic member may be disposed within the terminal body at a position adjacent to one surface of the terminal body with the socket, and the second magnetic member may be disposed within the connector at a position corresponding to the first magnetic member.

In an exemplary embodiment disclosed herein, the moving module may further include a third magnetic member disposed adjacent to one surface of the connector with the opening, and capable of generating a magnetic force with at least one of the first and second magnetic members.

In an exemplary embodiment disclosed herein, the third magnetic member may generate a magnetic force, which is smaller than the elastic force, with the second magnetic member, such that the coupling portion is inserted into the connector when the connector is not located adjacent to the terminal body.

In an exemplary embodiment disclosed herein, the third magnetic member may be disposed on one surface of the connector to face the first magnetic member, such that the opening is located at a position corresponding to the socket when the connector is moved to a position adjacent to the socket.

In an exemplary embodiment disclosed herein, the first and second magnetic members may be provided in plurality, respectively. At least two of the first magnetic members may be disposed on one surface of the terminal body at opposite sides to each other with interposing the socket therebetween, and at least two of the third magnetic members may be disposed on one surface of the connector at opposite sides to each other with interposing the opening therebetween.

In an exemplary embodiment disclosed herein, the plurality of first magnetic members may be arranged along one surface of the terminal body to have first and second polarities in an alternating manner, and the plurality of third magnetic members may be arranged along one surface of the connector to have the first and second polarities in an alternating manner, so as to generate attractive forces with the plurality of first magnetic members, respectively.

In an exemplary embodiment disclosed herein, the second magnetic member may be disposed at an opposite side to the first magnetic member with interposing the third magnetic member therebetween, such that the first to third magnetic member are arranged on the same line in the coupled state of the connector and the terminal body.

In an exemplary embodiment disclosed herein, the moving module may further include a moving member capable of being movable along a guide rail disposed in the connector, and the coupling portion and the second magnetic member may be coupled to the moving member so as to be movable along with the moving member.

In an exemplary embodiment disclosed herein, the moving member may include a first part having the coupling portion coupled thereto, and a second part protruding from the first part and having the second magnetic member coupled thereto.

In an exemplary embodiment disclosed herein, the guide rail may include a stopping portion capable of stopping the second part such that the moving member is moved by a predetermined stroke.

In an exemplary embodiment disclosed herein, the coupling portion may be provided with a chamfer formed at an end thereof.

In an exemplary embodiment disclosed herein, the terminal body may be provided with a connection groove formed at one surface thereof, and the connection groove may have at least part with a shape corresponding to the chamfer.

In an exemplary embodiment disclosed herein, the connection groove may have a profile greater than that of the socket.

In an exemplary embodiment disclosed herein, at least one of the first to third magnetic members may be configured as an electromagnet having polarity which is changeable according to a flowing direction of a current. The at least one magnetic member may be configured such that a current flows thereon in one direction of generating an attractive force with the remaining magnetic members of the first to third magnetic members.

In an exemplary embodiment disclosed herein, the terminal body may be provided with a battery. The at least one magnetic member may be configured such that a current flows thereon in an opposite direction to the one direction to generate a repulsive force against the remaining magnetic members of the first to third magnetic members when the battery is fully charged.

In an exemplary embodiment disclosed herein, the at least one magnetic member may be configured such that a current flows in the opposite direction to the one direction to generate the repulsive force against the remaining magnetic members of the first to third magnetic members, when a preset event is generated from the terminal body during charging of the battery.

In an exemplary embodiment disclosed herein, the mobile terminal may further include a controller capable of controlling the at least one magnetic member such that intensity of the flowing current is adjusted based on a user selection.

In an exemplary embodiment disclosed herein, a sensor unit capable of sensing a coupled state between the terminal body and the connector may be provided on one surface of the terminal body or one surface of the connector. The mobile terminal may further include a controller capable of controlling the at least one magnetic member such that the current starts to flow on the at least one magnetic member based on a sensing result of the sensor unit.

In an exemplary embodiment disclosed herein, the connector may be a charging connector for supplying power to the terminal body.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 5A to 5C are conceptual views illustrating an operation of a moving module in accordance with one exemplary embodiment disclosed herein;

DETAILED DESCRIPTION OF THE INVENTION

Figure 1A:
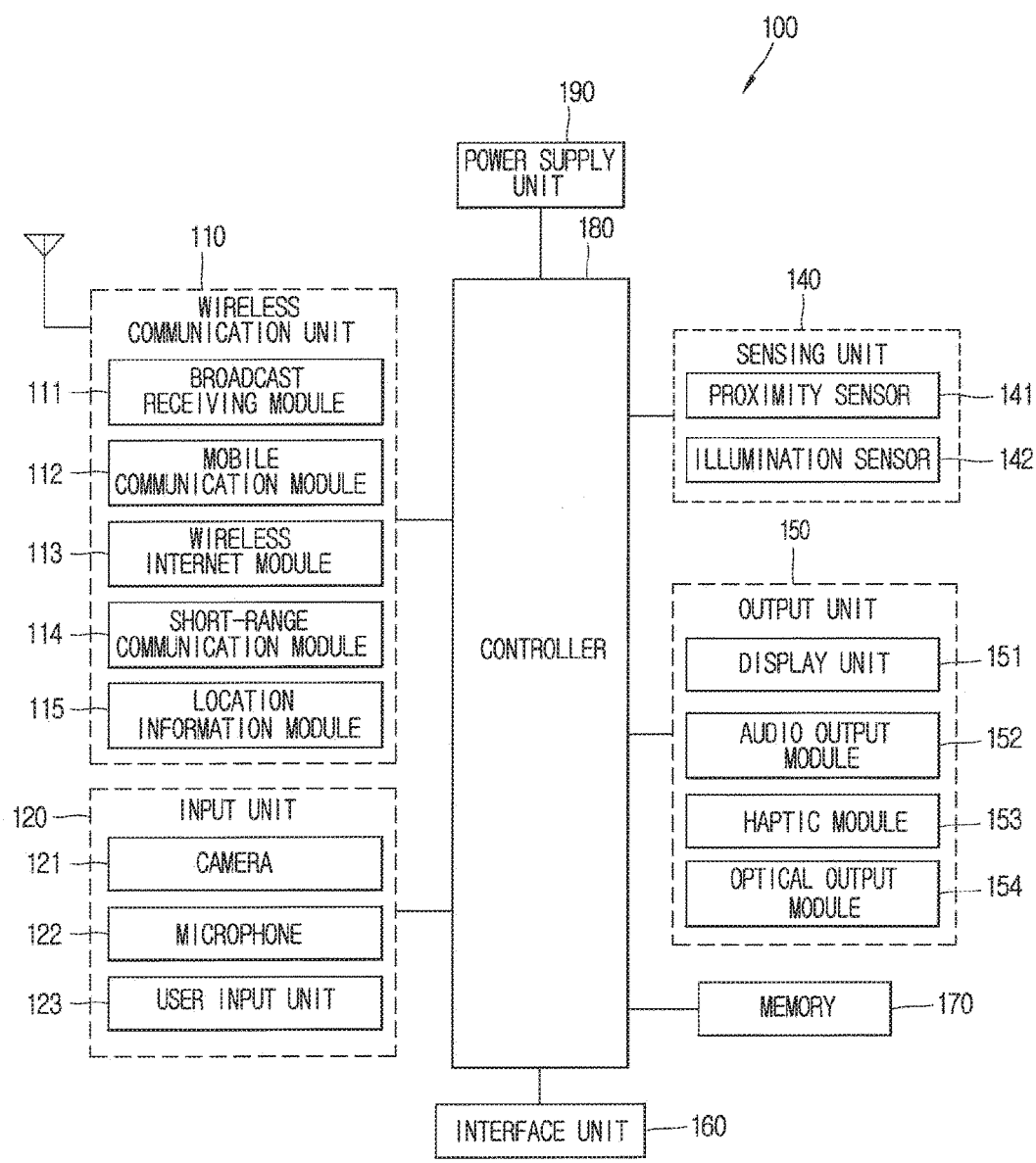
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
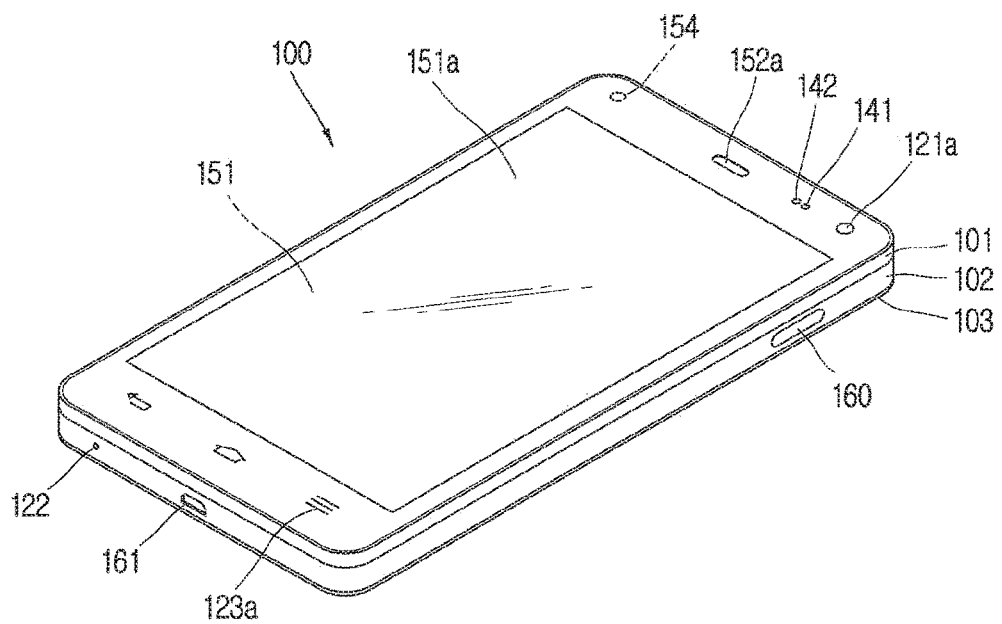
FIGS. 1B and 1C are conceptual views illustrating one example of a mobile terminal, viewed from different directions.
Figure 1C:
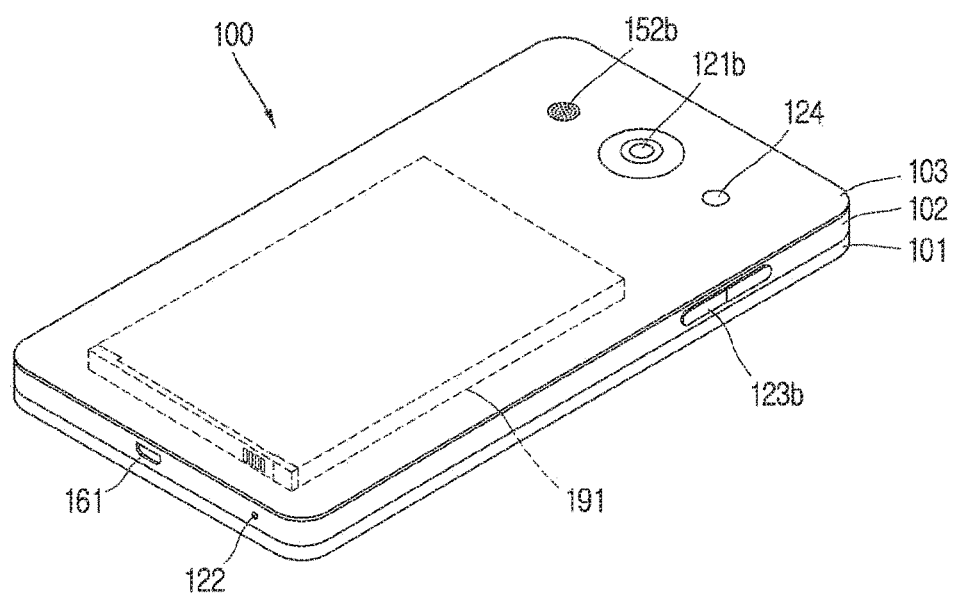

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, new types of user interfaces using the rear input unit can be implemented. Embodiments that include the aforementioned touch screen or the rear input unit may implement some or all of the functionality of the first manipulation unit 123a provided on the front surface of the terminal body. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The terminal body of the mobile terminal 100 disclosed herein can be connected with various types of external devices through a connector.

Hereinafter, a configuration of a terminal to which the connector is coupled will be described in detail with reference to FIG. 1B.

Referring to FIG. 1B, a terminal body of the mobile terminal 100 (hereinafter, referred to as a terminal body 100) may be provided with a connection groove 161 which is formed at one surface thereof and to which a connector is coupled (connected or mounted). The connection groove 161 may serve as a path for connecting the terminal body 100 and the connector.

Figure 2:
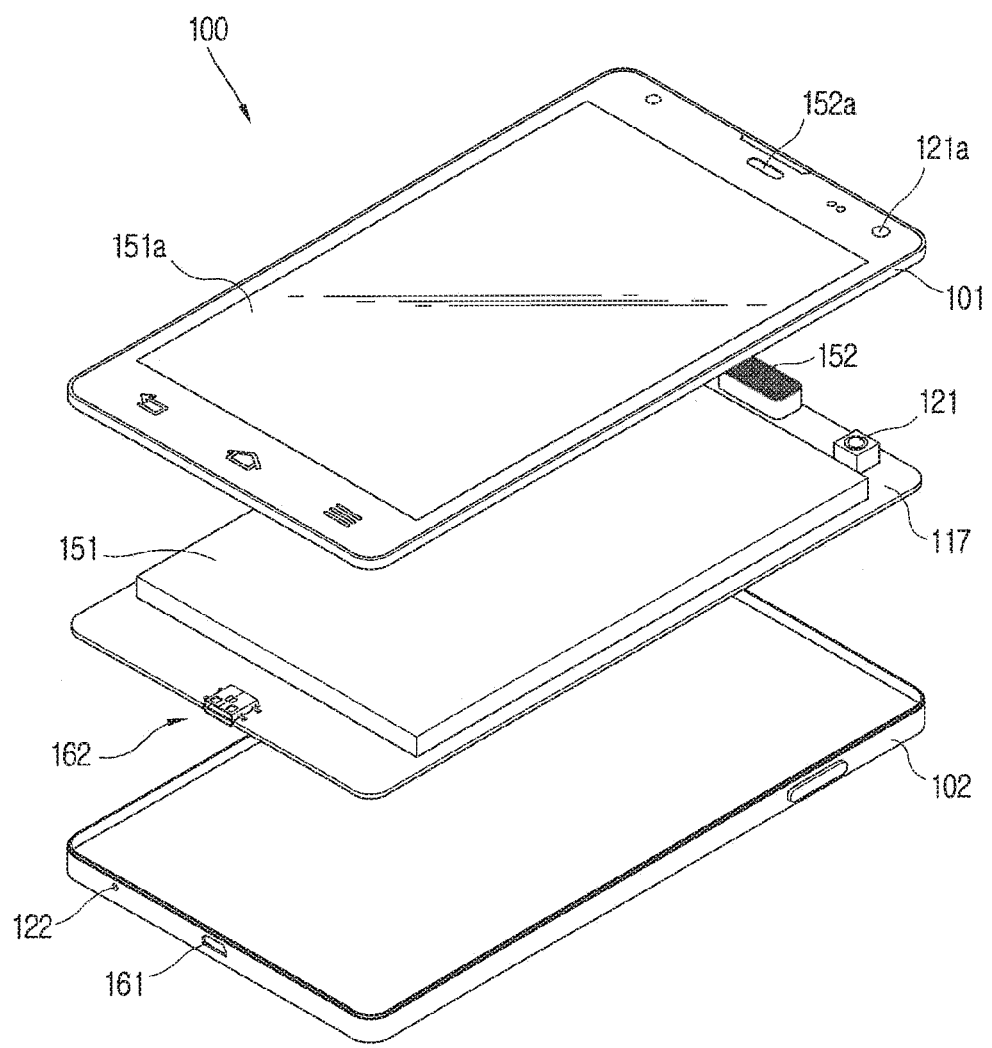
FIG. 2 is an exploded perspective view of a terminal body according to the present invention.

The terminal body 100 disclosed herein may be provided with a socket 162 (see FIG. 2). The socket 162 may be located within the connection groove 161. An inner circumferential surface of the socket 162 may be made of a conductive material for electric connection between the terminal body 100 and the connector.

Hereinafter, a configuration of the terminal body 100 with the socket 162 will be described in detail with reference to FIG. 2. FIG. 2 is an exploded perspective view of the terminal body 100 disclosed herein.

Referring to FIG. 2, the terminal body 100 may be provided with a printed circuit board 117. The printed circuit board 117 may be configured as one example of a controller for operating various functions of the mobile terminal. Various electronic components provided in the terminal body 100 may be mounted on the printed circuit board 117. For example, as illustrated in FIG. 2, the camera 121, the speaker 152 and the like may be mounted on the printed circuit board 117.

The socket 162 disclosed herein may be electrically connected to the printed circuit board 117. As illustrated, the socket 162 may be mounted on the printed circuit board 117. The connector may be electrically connected to the printed circuit board 117 via the socket 162. Accordingly, the printed circuit board 117 may process information related to data received through the connector.

Meanwhile, the connector 200 disclosed herein may include a coupling portion 210 which is insertable into the socket 162. That is, the coupling portion 210 may be inserted into the socket 162 through the connection groove 161.

Figure 3:
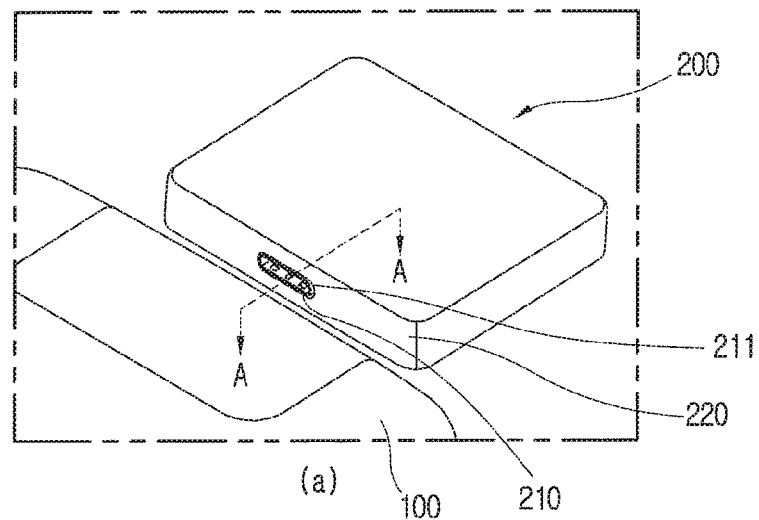
FIG. 3 is a view illustrating a detachable structure between a socket and a coupling portion according to the present invention.
Figure 3:
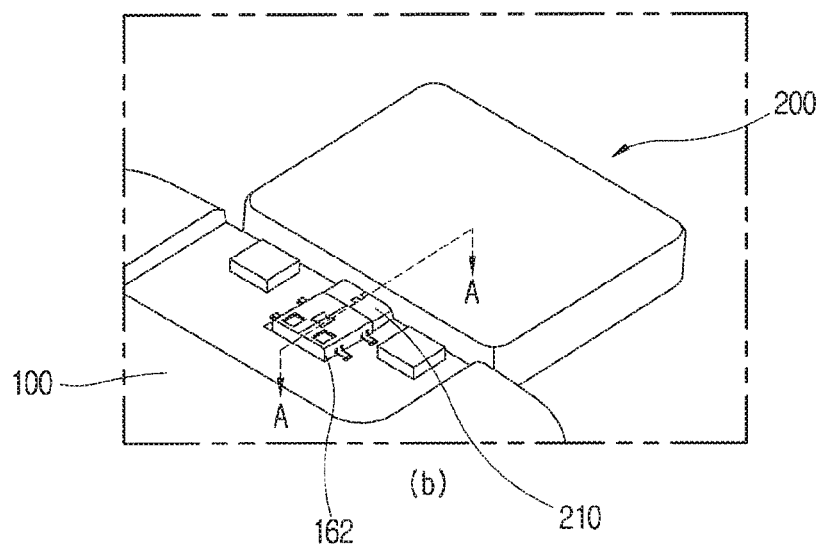
Figure 4:
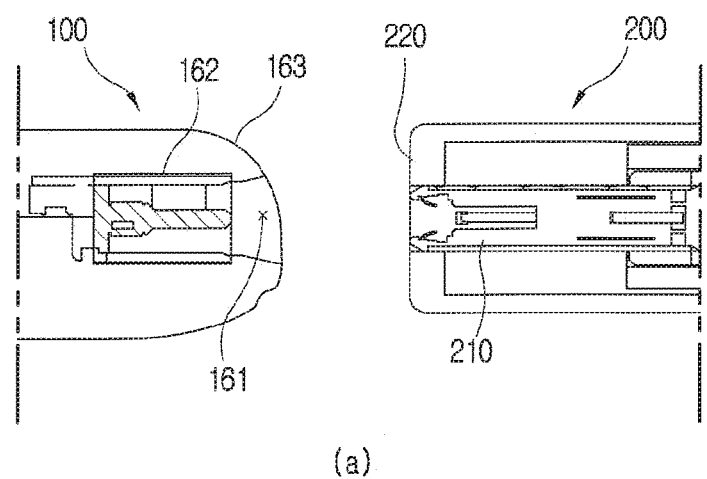
FIG. 4 is a sectional view taken along the line A-A of FIG. 3.
Figure 4:
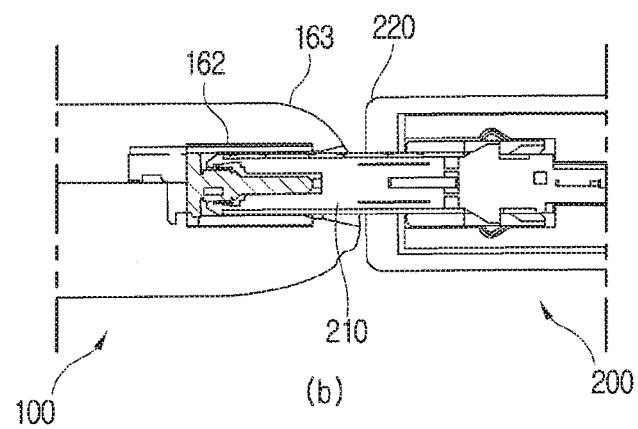

Hereinafter, description will be given in detail of a detachable structure between the socket 162 of the terminal body 100 and the coupling portion 210 of the connector 210, with reference to FIGS. 3 and 4. FIG. 3 is a view illustrating a detachable structure between a socket and a coupling portion according to the present invention, and FIG. 4 is a sectional view taken along the line A-A of FIG. 3.

The coupling portion 210 disclosed herein may be inserted into the connector 200 or drawn out of the connector 200.

In more detail, an opening 211 corresponding to a profile (or section) of the coupling portion 210 may be formed at one surface 220 of the connector 200. That is, the coupling portion 210 may be inserted into or drawn out of the connector 200 through the opening 211.

Here, inserting the coupling portion 210 into the connector 200 may refer to fully inserting the coupling portion 210 into the connector 200 such that the coupling portion 210 does not protrude to the one surface 220 of the connector 200. Also, drawing the coupling portion 210 out of the connector 200 may refer to at least part of the coupling portion 210 protruding from the one surface 220 of the connector 200.

However, the present invention may not be necessarily limited to this. For example, when the coupling portion 210 is inserted into the connector 200, it may mean that a protruded length of the coupling portion 210 is less than a preset length. Also, when the coupling portion 210 is drawn out of the connector 200, it may mean that the protruded length of the coupling portion 210 is more than a preset length. According to these criteria, even when the coupling portion 210 slightly protrudes from the one surface 220 of the connector 200, it may be understood that the coupling portion 210 is inserted into the connector 200.

(a) of FIG. 3 and (a) of FIG. 4 illustrate a state that the coupling portion 210 is inserted in the connector 200, and (b) of FIG. 3 and (b) of FIG. 4 illustrate a state that the coupling portion 210 is drawn out of the connector 200.

Referring to those drawings, the coupling portion 210 may be configured to be inserted in the connector 200 when the connector 200 is detached (or separated) from the terminal body 100, and to be drawn out of the connector 200 when the connector 200 is attached (coupled or mounted) to the terminal body 100.

Here, the case where the connector 200 is attached to the terminal body 100 may refer to a case where at least part of the one surface 220 of the connector 200, at which the opening 211 is formed, is brought into contact with at least part of one surface 163 of the terminal body 100, at which the connection groove 161 is formed.

Meanwhile, the structure of inserting or drawing out the coupling portion 210 may be implemented in a manner that the coupling portion 210 is movable within an inner space of the connector 200.

Hereinafter, a moving module for allowing a movement of the coupling portion 210 will be described in detail, with reference to the accompanying drawings.

Figure 5B:
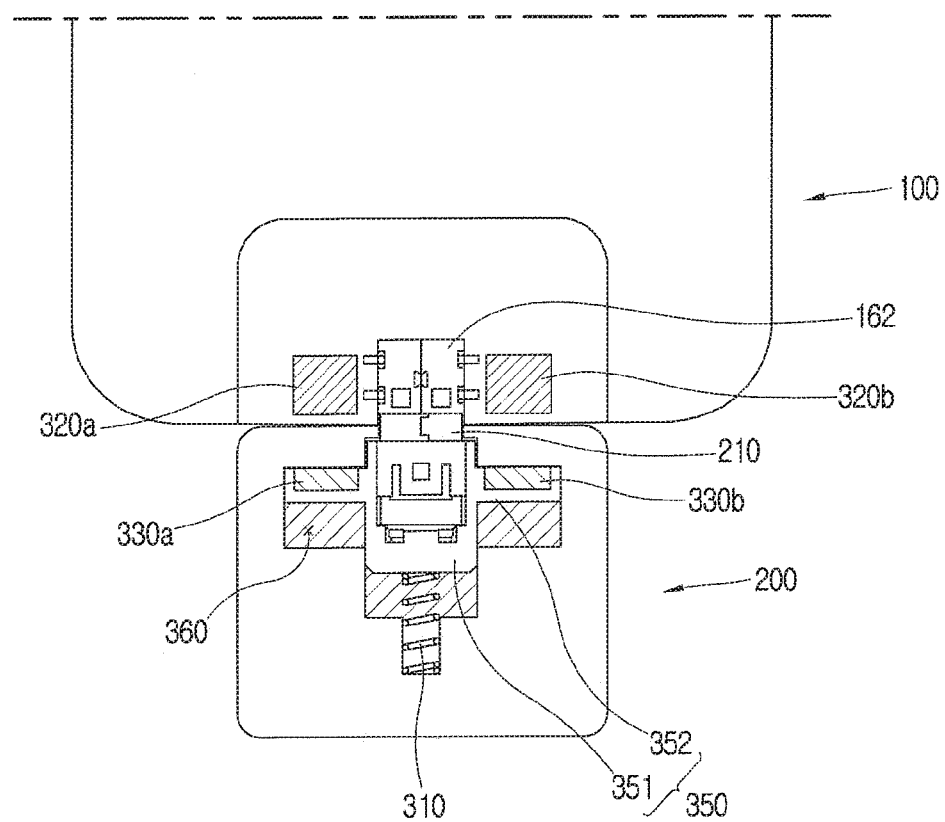
Figure 5C:
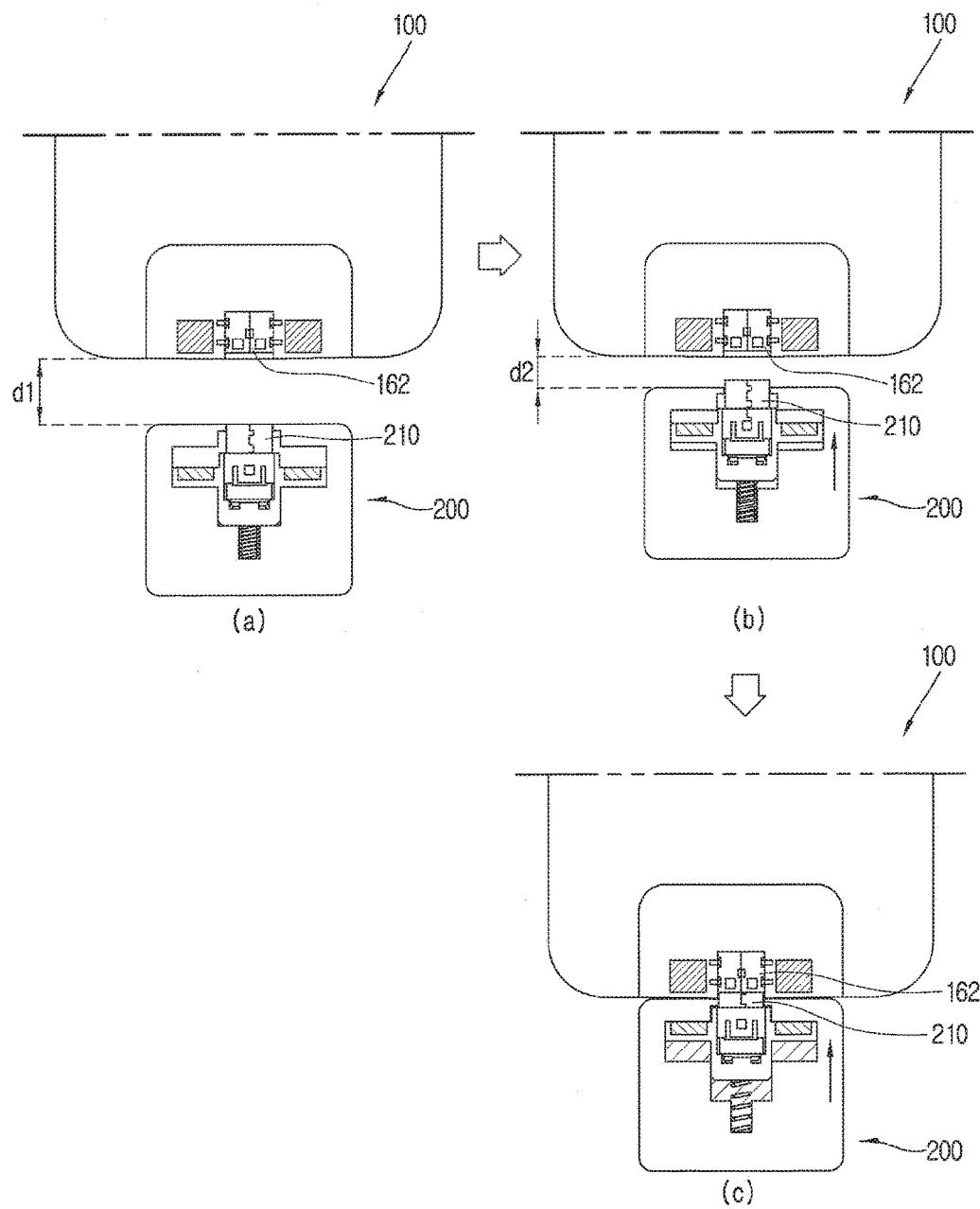

FIGS. 5A to 5C are conceptual views illustrating an operation of a moving module in accordance with one exemplary embodiment disclosed herein.

Hereinafter, a configuration of the moving module will first be described, and then a principle of operating the moving module will be described.

In accordance with this exemplary embodiment, the moving module may include an elastic member 310, and first and second magnetic members 320 and 330.

In the drawings, reference numerals 320a and 320b denote the first magnetic member, and 330a and 330b denote the second magnetic member. Hereinafter, although reference numerals 320 and 330 are not shown in the drawings, it may be understood as including 320a and 320b and 330a and 330b, respectively.

The elastic member 310 may be disposed in the connector 200, to apply an elastic force to the coupling portion 210 in a direction that the coupling portion 210 is inserted into the connector 200.

In more detail, one end of the elastic member 310 may be fixed to the connector 200, and another end thereof disposed at an opposite side to the one end may be connected to the coupling portion 210.

Also, the elastic member 310 may be disposed within an inner space of the connector 200 in a manner that a lengthwise direction of the elastic member 310 is in parallel to a moving direction of the coupling portion 210.

As illustrated in the drawings, one example of the elastic member 310 may be a tension coil spring. However, the elastic member according to the present invention may not be limited to the tension coil spring, but another elastic member having various shapes and arrangements may also be employed. Another exemplary embodiment of the elastic member will be described later with reference to FIGS. 6A and 6B.

The first magnetic member 320a, 320b may be disposed at the terminal body 100. In more detail, the first magnetic member 320a, 320b may be arranged adjacent to one surface of the terminal body 100, at which the connection groove 161 (or the socket 162) is formed.

Those drawings illustrate that the first magnetic member 320a, 320b is arranged within an inner space of the terminal body 100, but the present invention may not be necessarily limited to this. For example, the first magnetic member 320a, 320b may be arranged adjacent to the one surface 163 of the terminal body 100 at an outer surface of the terminal body 100. Alternatively, a part of the one surface 163 of the terminal body 100 may be the first magnetic member 320a, 320b.

The second magnetic member 330a, 330b may be coupled to the coupling portion 210 to apply a force to the coupling portion 210 in a direction that the coupling portion 210 is drawn out of the connector 200. The second magnetic member 330a, 330b may generate a magnetic force along with the first magnetic member 320a, 320b.

Those drawings illustrate that the second magnetic member 330a, 330b is coupled to a side surface of the coupling portion 210, but the coupling position of the second magnetic member 330a, 330b at the coupling portion 210 may not be limited to this.

Meanwhile, those drawings illustrate that each of the first and second magnetic members 320 and 330 is provided as a pair, respectively, but the numbers of the first and second magnetic members 320 and 330 may not be limited to these, but be employed more or less.

Referring back to FIG. 5A or 5B, the moving module may further include a guide rail 360 and a movable member 350 movable along the guide rail 360.

The coupling portion 210 and the second magnetic member 330a, 330b may be mounted to the movable member 350. That is, the coupling portion 210 and the second magnetic member 330a, 330b may be mounted to the movable member 350, respectively, so as to be movable along with the movable member 350 when the movable member 350 is moved.

In more detail, the coupling portion 210 and the second magnetic member 330a, 330b may be disposed at different positions of the movable member 350, respectively.

In other words, the moving member 350 may include a first part 351 having the coupling portion 210 coupled thereto and a second part 352 having the second magnetic member 330a, 330b coupled thereto. Shapes of the first and second parts 351 and 352 will be described in detail later.

Still referring to FIG. 5A or 5B, when the coupling portion 210 and the second magnetic member 330a, 330b are coupled to the moving member 350, one end of the elastic member 310 may be fixed to the connector 200 and an opposite end of the one end of the elastic member 310 may be fixed to the moving member 350. Therefore, the elastic member 310 may apply the elastic force to the coupling portion 210 through the moving member 350.

Meanwhile, the second magnetic member 330a, 330b may be located within the connector 200 at a position corresponding to the first magnetic member 320a, 320b.

In more detail, the second magnetic member 330a, 330b may be disposed on the moving member 350 at a position facing the first magnetic member 320a, 320b.

Meanwhile, the guide rail 360 may be formed in the connector 200 to guide the movement of the moving member 350.

More concretely, the guide rail 360 may be configured to have a width generally corresponding to a width of the moving member 350.

At least part of the guide rail 360 may generally be perpendicular to the opening 211 of the connector 200. A detailed shape of the guide rail 360 may correspond to the shape of the moving member 350, which will be described again later.

Hereinafter, a principle of operating the moving module will be described in more detail.

Referring to FIG. 5A, when the connector 200 disclosed herein is fully separated (or spaced apart) from the terminal body 100, the coupling portion 210 may be maintained in an inserted state in the connector 200.

In detail, when the connector 200 is fully spaced apart from the terminal body 100, a magnetic force (more concretely, attractive force) generated between the first and second magnetic members 320 and 330 may be smaller than an elastic force applied by the elastic member 310 to the coupling portion 210.

Accordingly, since a force applied to the coupling portion 210 in a direction that the coupling portion 210 is inserted into the connector 200 is greater than a force applied to the coupling portion 210 in a direction that the coupling portion 210 is drawn out of the connector 200, the coupling portion 210 may be kept inserted in the connector 200.

Referring to FIG. 5B, while the coupling portion 210 is inserted in the connector 200, when the connector 200 is moved adjacent to the terminal body 100, the coupling portion 210 may be drawn out of the connector 200.

In detail, when the connector 200 is moved adjacent to the terminal body 100, the magnetic force (more concretely, attractive force) generated between the first and second magnetic members 320 and 330 may be greater than the elastic force applied by the elastic member 310 to the coupling portion 210.

Accordingly, since the force applied to the coupling portion 210 in the direction that the coupling portion 210 is drawn out of the connector 200 is greater than the force applied to the coupling portion 210 in the direction that the coupling portion 210 is inserted into the connector 200, the coupling portion 210 may be drawn out of the connector 200.

In addition, referring to (a) to (c) of FIG. 5C, when the connector 200 is moved to a position adjacent to the socket 162 while the coupling portion 210 is inserted in the connector 200 by the elastic force, the coupling portion 210 may be drawn out of the connector 200 and then inserted into the socket 162.

In more detail, (a) of FIG. 5C may correspond to the state illustrated in FIG. 5A. That is, as the terminal body 100 and the connector 200 are fully spaced apart from each other, the coupling portion 210 can be inserted into the connector 200.

Referring to (a) and (b) of FIG. 5C, a change in relative positions of the terminal body 100 and the connector 200 may result from an external force other than the magnetic force or the elastic force.

For example, as illustrated in (a) of FIG. 5C, in a fully-spaced state between the terminal body 100 and the connector 200, when a user applies an external force, as illustrated in (b) of FIG. 5C, the spaced state may change into a state that the terminal body 100 and the connector 200 are adjacent to each other.

Referring to (b) and (c) of FIG. 5C, the connector 200 may automatically be coupled to the terminal body 100 in a state that the connector 200 is located adjacent to the terminal body 100, and substantially at the same time, the coupling portion 210 may be inserted into the socket 162. In this instance, (c) of FIG. 5C may correspond to the state illustrated in FIG. 5B.

In more detail, when the terminal body 100 is located adjacent to the connector 200, the connector 200 may be coupled to the terminal body 100 by the attractive force between the first and second magnetic members 320 and 330, even without any separately-applied external force.

Simultaneously, the moving member 350 may be moved along the guide rail 360 and accordingly the coupling portion 210 can be inserted into the socket 162.

Considering the relative operation illustrated in FIG. 5C again, when a spaced distance between the connector 200 and the terminal body 100 is more than a predetermined distance d1 (see (a) of FIG. 5C), the connector 200 may be fully spaced apart from the terminal body 100 and the coupling portion 210 may be kept inserted in the connector 200.

At the moment when the spaced distance between the connector 200 and the terminal body 100 is shorter than a predetermined distance d2, the connector 200 may be coupled to the terminal body 100 without a separate external force and accordingly the coupling portion 210 may be drawn out of the connector 200 and then inserted into the socket 162 of the terminal body 100.

So far, the detailed operation of the moving module disclosed herein has been described. Hereinafter, as aforementioned, description will be given of another exemplary embodiment of the elastic member applied to the present invention.

Figure 6A:
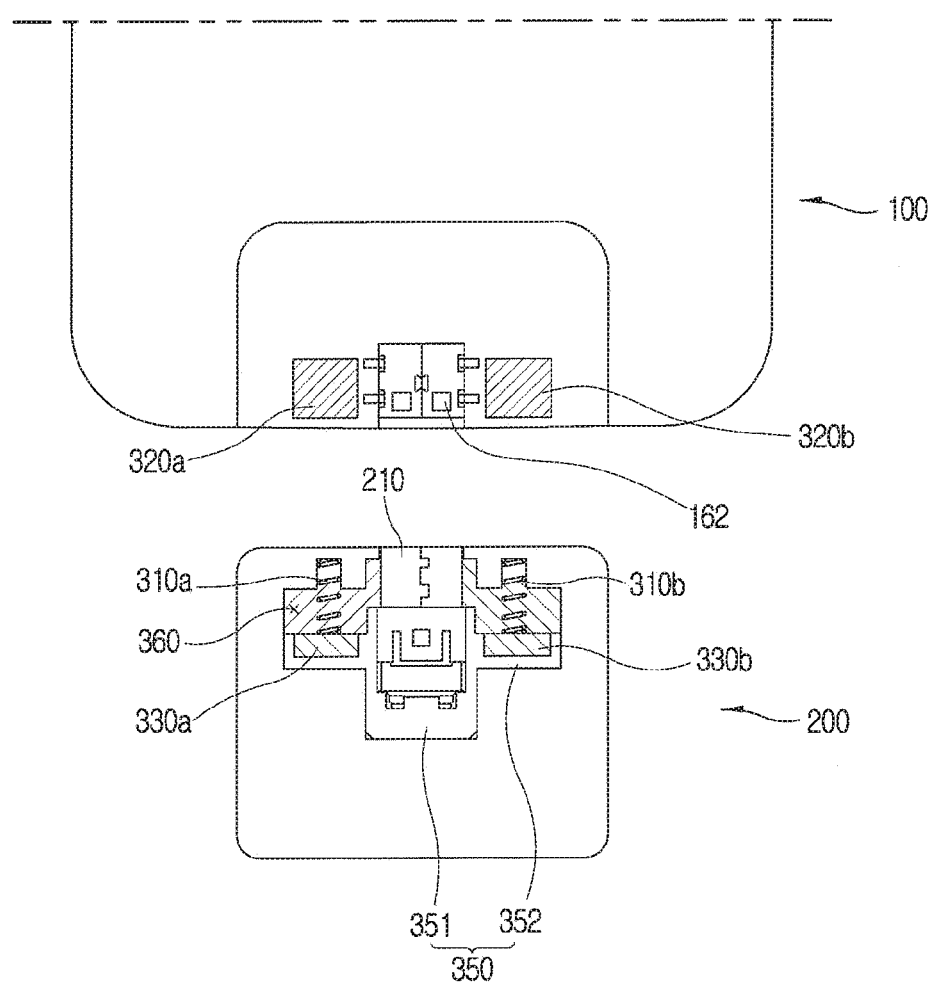
FIGS. 6A and 6B are conceptual views illustrating an operation of a moving module with an elastic member in accordance with another exemplary embodiment disclosed herein.
Figure 6B:
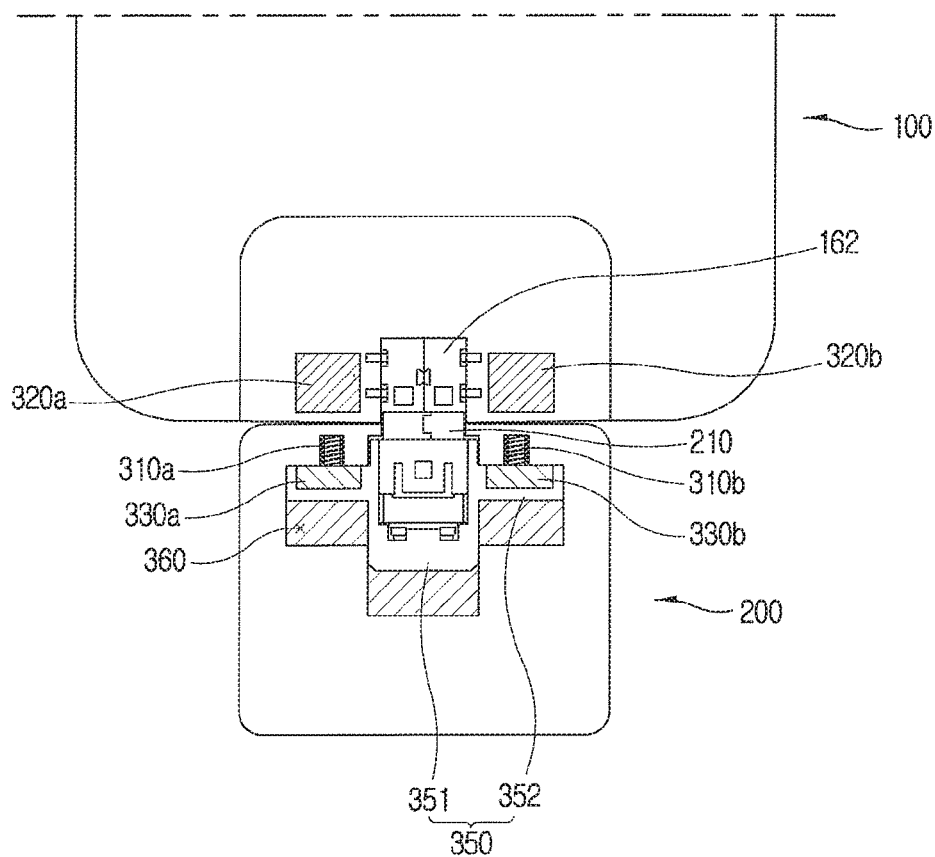

FIGS. 6A and 6B are conceptual views illustrating an operation of the moving module having elastic members 310a and 310b in accordance with another exemplary embodiment disclosed herein.

Referring to FIGS. 6A and 6B, elastic members 310a and 310b of the moving module may be a compression coil spring. Here, the compression coil spring may be a spring which applies an elastic force to an external object in its return direction when compressed.

Meanwhile, for the sake of the following explanation, one side of the connector 200 where the coupling portion 210 is arranged based on the moving member 350 may be referred to as a front side of the connector 200, and an opposite side to the arranged side of the coupling portion based on the moving member 350 may be referred to as a rear side of the connector 200.

In this manner, when the elastic members 310a and 310b are the compression coil spring, the elastic members 310a and 310b may be disposed at the front side of the connector 200. For reference, when the elastic member is a tension coil spring, the elastic member is arranged at the rear side of the connector 200 (see FIG. 5A).

In more detail, the elastic members 310a and 310b may be arranged as a pair at the front side of the connector 200 to be adjacent to both sides of the socket 162. That is, as illustrated in FIGS. 6A and 6B, the pair of elastic members 310a and 310b may be configured such that one end of each may be connected to the connector 200 and another end of each is connected to the second part 352.

The foregoing description has been given in detail of the embodiment having the first and second magnetic members. Hereinafter, description will be given in detail of an exemplary embodiment in which the moving module includes first to third magnetic members, with reference to the accompanying drawings.

Figure 7A:
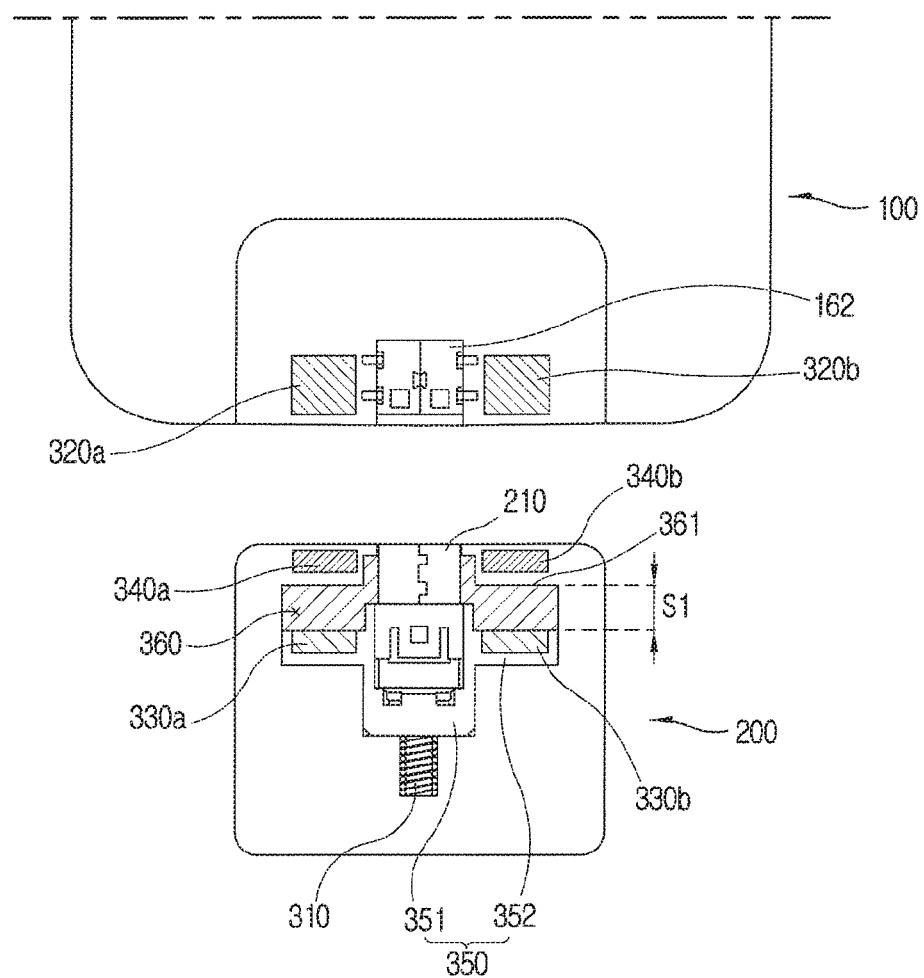
FIGS. 7A and 7B are conceptual views illustrating an operation of a moving module in accordance with another exemplary embodiment disclosed herein.
Figure 7B:
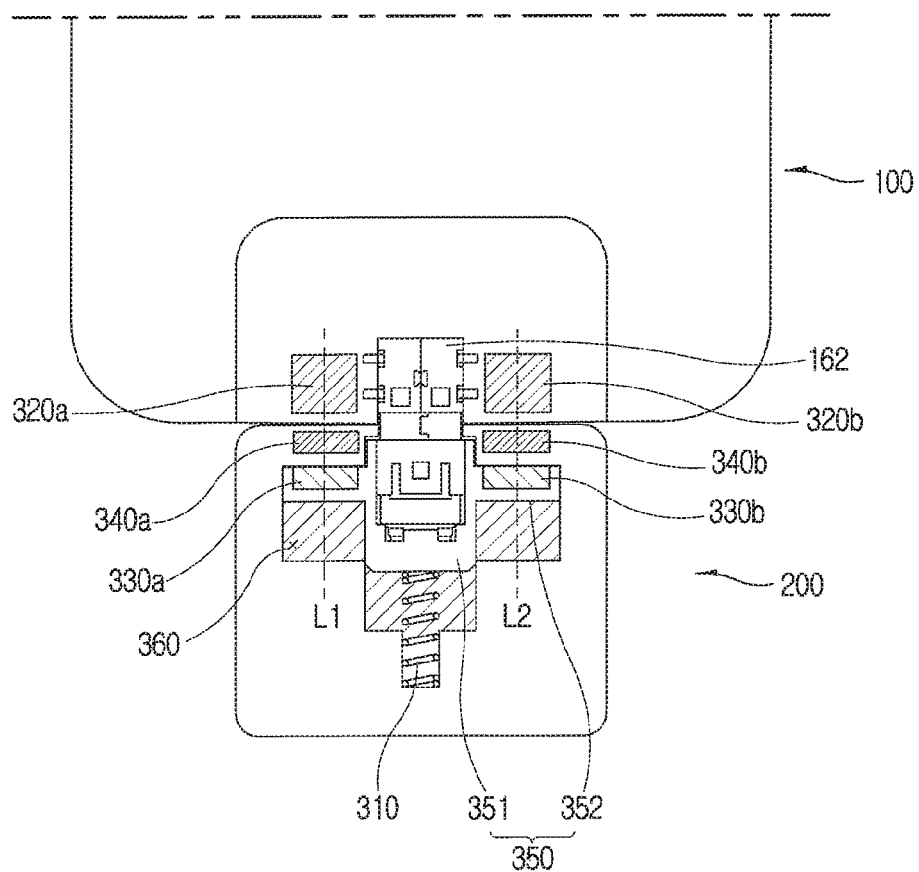
Figure 8A:
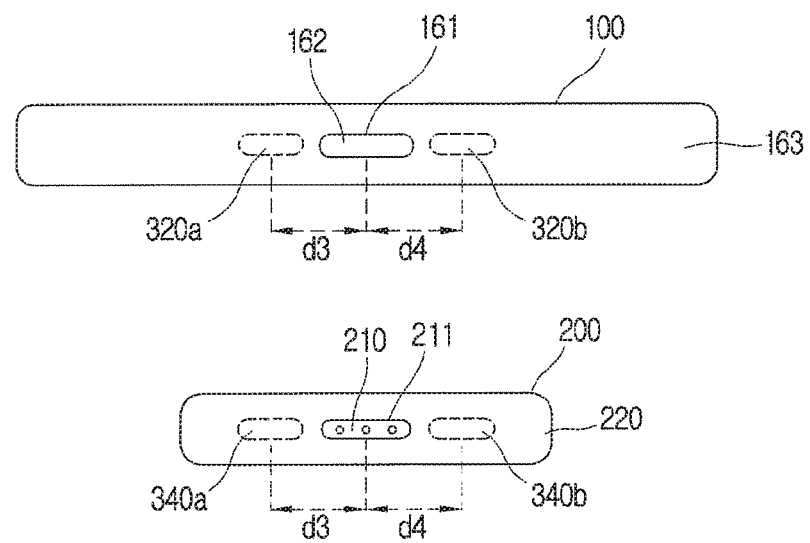
FIGS. 8A and 8B are conceptual views illustrating an arrangement of first and third magnetic members provided at a moving module in accordance with another exemplary embodiment disclosed herein.
Figure 8B:
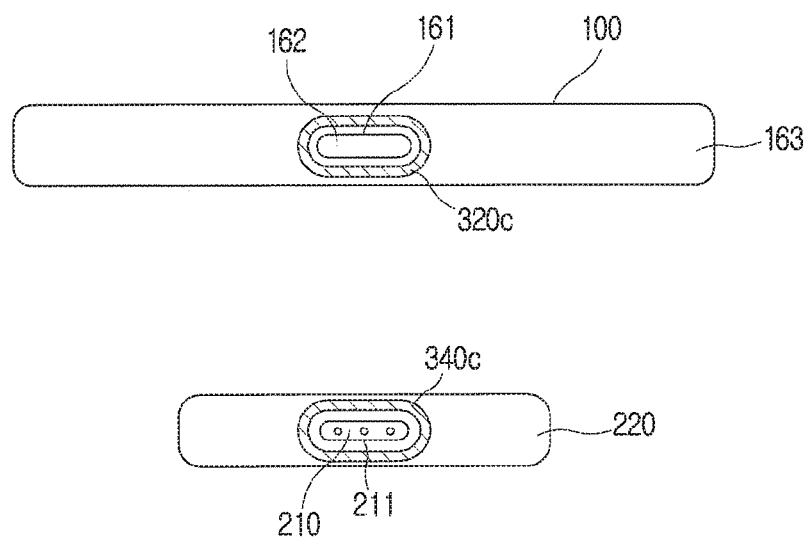
Figure 9:
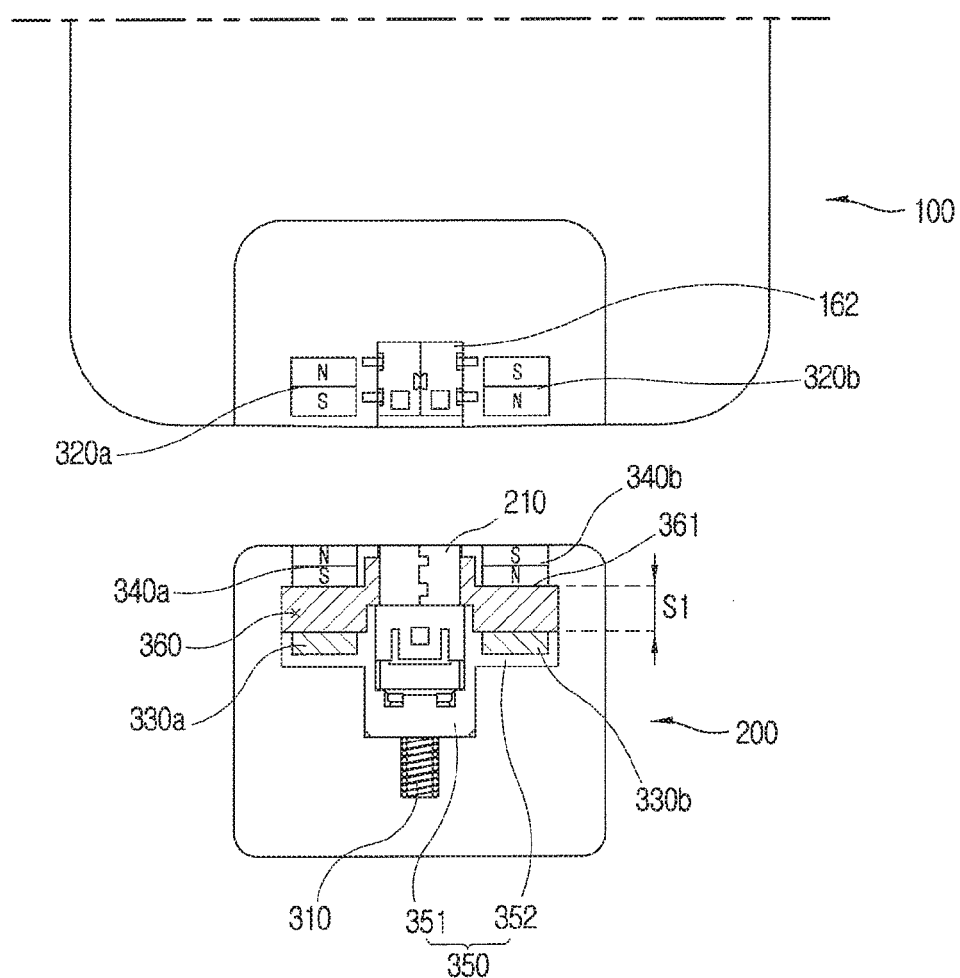
FIG. 9 is a conceptual view illustrating a polarity arrangement of the first and third magnetic members.

FIGS. 7A and 7B are conceptual views illustrating an operation of a moving module in accordance with another exemplary embodiment disclosed herein, FIGS. 8A and 8B are conceptual views illustrating an arrangement of first and third magnetic members provided at the moving module in accordance with another exemplary embodiment disclosed herein, and FIG. 9 is a conceptual view illustrating a polarity arrangement of the first and third magnetic members.

The moving module according to this exemplary embodiment may include first to third magnetic members 320, 330 and 340.

Meanwhile, in those drawings, reference numerals 340a and 340b denote the third magnetic member. However, although a reference numeral 340 is not shown in the drawings, it may be understood as including 340a and 340b.

Detailed description of the elastic member and the first and second magnetic members 320 and 330 has been given with reference to FIGS. 5A to 5C, so it will be omitted.

Referring to FIGS. 7A and 7B, the third magnetic member 340a, 340b may be disposed within the connector 200. In more detail, the third magnetic member 340a, 340b may be arranged adjacent to one surface at which the opening 211 of the connector 200 is formed.

Those drawings illustrate that the third magnetic member 340a, 340b is arranged within an inner space of the connector 200, but the present invention may not be necessarily limited to this. For example, the third magnetic member 340a, 340b may be arranged at an external space of the connector 200 in a manner of being adjacent to the one surface 220 of the connector 200. Alternatively, a part of the one surface 220 of the connector 200 may be the third magnetic member 340a, 340b.

The third magnetic member 340a, 340b may be arranged on the one surface 220 of the connector 200 at a position corresponding to the position of the first magnetic member 320a, 320b. In other words, the third magnetic member 340a, 340b may be arranged to face the first magnetic member 320a, 320b.

Meanwhile, as aforementioned, the second magnetic member 330a, 330b is arranged on the moving member 350 at the position corresponding to the first magnetic member 320a, 320b.

That is, the first and second magnetic members 320 and 330 may be disposed opposite to each other with interposing the third magnetic member 340a, 340b therebetween. In other words, the third magnetic member 340a, 340b may be arranged at the connector 200 such that one end thereof faces the first magnetic member 320a, 320b and another end opposite to the one end faces the second magnetic member 330a, 330b.

With the structure, as illustrated in FIG. 7B, in the state that the connector 200 is coupled to the terminal body 100, the first to third magnetic members 320, 330 and 340 may be arranged on the same lines L1, L2.

Hereinafter, the arrangement relation among the first to third magnetic members will be described with reference to FIGS. 8A and 8B.

The first and third magnetic members may be provided in plurality on the terminal body 100 and the connector 200, respectively.

Referring to FIG. 8A, if the first magnetic member 320a, 320b is provided as a pair, the third magnetic member 340a, 340b may also be provided as a pair. On the other hand, the numbers of the first and third magnetic members 320 and 340 may not be limited to those illustrated in the drawing, but may also be employed more or less.

In more detail, the pair of first magnetic members 320a and 320b may be coupled to the one surface 163 of the terminal body 100 at opposite sides based on the connection groove 161 (or socket 162).

Also, the pair of third magnetic members 340a and 340b may be disposed on the one surface 220 of the connector 200 at opposite sides to each other based on the opening 211.

In this instance, a distance d3 from one first magnetic member 320a of the pair of magnetic members 320a and 320b to the connection groove 161 (or socket 162) may correspond to a distance d3 from one third magnetic member 340a of the pair of third magnetic members 340a and 340b to the opening 211. Here, the corresponding distance may refer to substantially the same distance.

Also, a distance d4 from another one first magnetic member 320b of the pair of first magnetic members 320a and 320b, other than the one first magnetic member 320a, to the connection groove 161 (or socket 162) may correspond to a distance d4 from another one third magnetic member 340b of the pair of third magnetic members 340a and 340b, other than the one third magnetic member 340a, to the opening 211.

Alternatively, referring to FIG. 8B, a third magnetic member 340c may have a shape corresponding to the shape of a first magnetic member 320c.

For example, if the first magnetic member 320c has a shape surrounding the connection groove 161, the third magnetic member 340c may also have a shape surrounding the opening 211. In addition, the first and third magnetic members 320c and 340c may have the same profile (or section).

With the structure, when the connector 200 is located adjacent to the one surface 163 of the terminal body 100, the opening 211 may be arranged at a position corresponding to the connection groove 161 (or socket 162) due to an attractive force between the first and third magnetic members 320 and 340, thereby coupling the connector 200 to the terminal body 100.

In accordance with the present invention, if the connector 200 is merely located adjacent to the terminal body 100, the connector 200 can be guided to be coupled to an accurate position of the terminal body 100, without inconvenience in that the user has to couple the connector 200 to the terminal body 100 with checking the positions of the connection groove 161 and the opening 211.

Hereinafter, a polarity arrangement of the first and third magnetic members will be described with reference to FIG. 9.

Each of the first and third magnetic members 320 and 340 may have first and second polarities. For example, the first polarity may refer to a South pole (S-pole) and the second polarity may refer to a North pole (N-pole).

The first magnetic member 320a, 320b may be arranged such that a portion having one of the first and second polarities faces the one surface 163 of the terminal body 100 within the terminal body 100.

In this instance, the third magnetic member 340a, 340b corresponding to the first magnetic member 320a, 320b may be arranged such that a portion having another polarity, other than the one polarity, faces the one surface 220 of the connector 200 within the connector 200.

Accordingly, the attractive forces may be applied between the first magnetic member 320a, 320b and the third magnetic member 340a, 340b corresponding to the first magnetic member 320a, 320b.

Meanwhile, as aforementioned, the first and second magnetic members may be provided in plurality, respectively.

In this instance, the plurality of first magnetic members 320a and 320b may be arranged along the one surface 163 of the terminal body 100 to have the first and second polarities in an alternating manner.

Also, the plurality of third magnetic members 340a and 340b may be arranged along the one surface 220 of the connector 200 to have the first and second polarities in an alternating manner, so as to generate the attractive force with the plurality of first magnetic members 320a and 320b.

For example, as illustrated in FIG. 9, one first magnetic member 320a of the pair of first magnetic members 320a and 320b may be arranged such that the first polarity faces the one surface 163 of the terminal body 100 and the other first magnetic member 320b, other than the one first magnetic member 320a, may be arranged such that the second polarity faces the one surface 163 of the terminal body 100.

In this instance, the third magnetic member 340a corresponding to the first magnetic member 320a may be arranged such that the second polarity faces the one surface 220 of the connector 200, and the third magnetic member 340b corresponding to the other first magnetic member 320b may be arranged such that the first polarity faces the one surface 220 of the connector 200.

This structure can minimize interference caused between the plurality of first magnetic members 320a and 320b when the plurality of first magnetic members 320a and 320b are provided within the terminal body 100, and similarly can minimize interference caused between the plurality of third magnetic members 340a and 340b when the plurality of third magnetic members 340a an 340b are provided in the connector 200.

Hereinafter, a principle of operating the moving module in accordance with another exemplary embodiment disclosed herein will be described in more detail with reference to FIGS. 7A and 7B.

The third magnetic member 340 may generate a magnetic force with at least one of the first and second magnetic members 320 and 330. Meanwhile, description will be given under assumption that the magnetic force is an attractive force.

Referring to FIG. 7A, when the connector 200 is not located adjacent to the terminal body 100, the coupling portion 210 may be kept inserted in the connector 200.

In detail, when the connector 200 is not located adjacent to the terminal body 100, the sum of attractive forces applied by the first and third magnetic members 320 and 340 to the second magnetic member 330 may be smaller than an elastic force applied by the elastic member 310.

In addition, when the connector 200 is sufficiently spaced apart from the terminal body 100, the attractive force applied by the first magnetic member 320 to the second magnetic member 330 may be small enough, and thus can be ignored. In this instance, the attractive force generated between the second and third magnetic members 330 and 340 may be smaller than the elastic force.

Accordingly, since a force applied to the coupling portion 210 in a direction of inserting the coupling portion 210 into the connector 200 is greater than a force applied to the coupling portion 210 in a direction of drawing the coupling portion 210 out of the connector 200, the coupling portion 210 can be kept inserted in the connector 200.

Referring to FIG. 7B, as aforementioned, in the state that the coupling portion 210 is located in the connector 200, when the connector 200 is moved adjacent to the terminal body 100, the coupling portion 210 may be drawn out of the connector 200.

In detail, when the connector 200 is moved adjacent to the terminal body 100, the sum of attractive forces of the first and third magnetic members 320 and 340 applied to the second magnetic member 320 may be greater than the elastic force applied by the elastic member 310.

Accordingly, since the force applied to the coupling portion 210 in the direction of drawing the coupling portion 210 out of the connector 200 is greater than the force applied to the coupling portion 210 in the direction of inserting the coupling portion 210 into the connector 200, the coupling portion 210 may be drawn out of the connector 200.

So far, the foregoing description has been given in detail of the moving module according to the another exemplary embodiment, namely, the moving module of moving the coupling portion 210 by the interaction of the at least three magnetic members.

Consequently, in this exemplary embodiment, the third magnetic member 340a, 340b fixed to the connector 200 is employed, separate from the second magnetic member 330a, 330b coupled to the moving member 350.

That is, the second magnetic member 330a, 330b may generally serve to move the moving member 350, and the third magnetic member 340a, 340b may generally serve to couple the connector 200 and the terminal body 100 to each other. This may facilitate the connector 200 to be coupled to the terminal body 100 and also accurately determine the insertion or non-insertion of the coupling portion 210 according to whether or not the connector 200 is coupled to the terminal body 100.

Hereinafter, detailed shapes of the first and second parts 351 and 352 of the moving member 350 according to the present invention will be described with reference to FIG. 7A.

Also, a stroke of the moving member 350 (or socket 162) will be described by comparing FIGS. 7A and 10.

Figure 10:
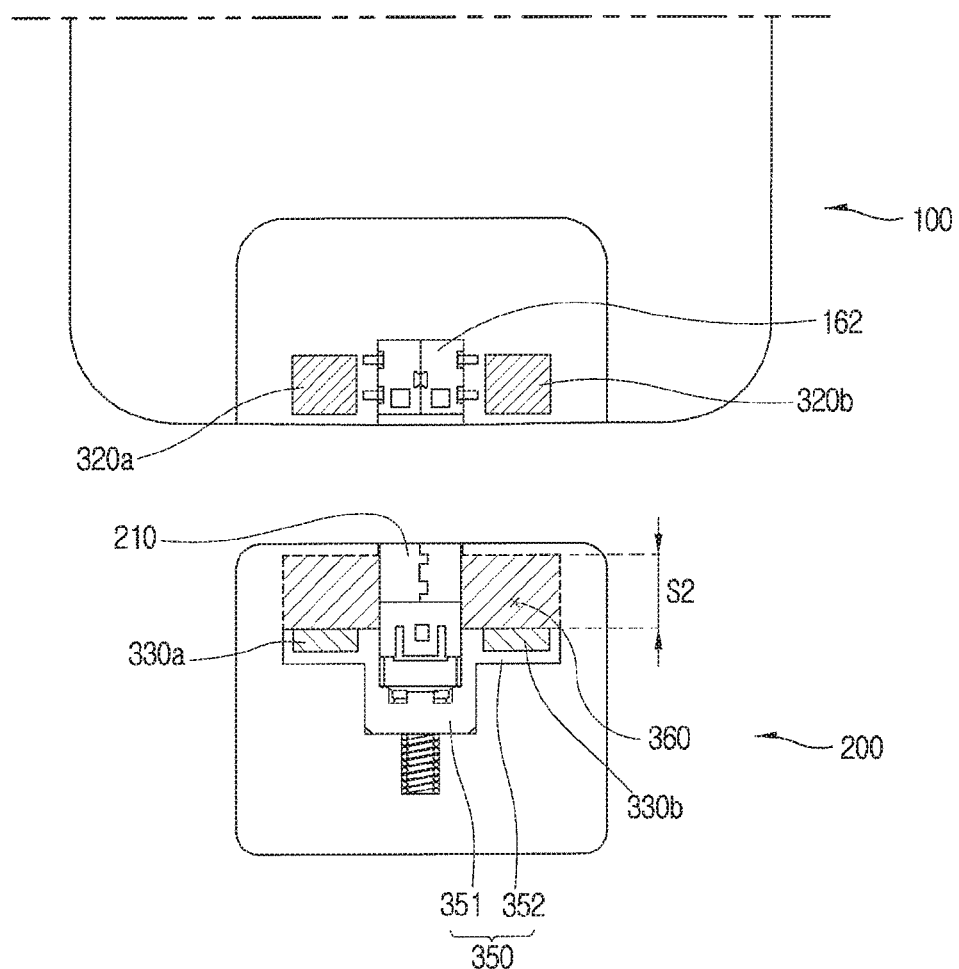
FIG. 10 is a conceptual view illustrating a shape of a moving member and a stroke of a moving module associated with the shape of the moving member.

FIG. 10 is a conceptual view illustrating a shape of a moving member and a stroke of a moving module associated with the shape of the moving member.

Referring back to FIG. 7A, the moving member 350 may include the first part 351 to which the coupling portion 210 is coupled, and the second part 352 which protrudes from the first part 351 and to which the second magnetic member 330a, 330b is coupled.

The second part 352 may have a profile smaller than that of the first part 351, and protrude from a side surface of the first part 351.

The first and second parts 351 and 352 may be arranged such that at least part of each faces the one surface 220 of the connector 200.

In more detail, due to the structure that the second part 352 protrudes from the first part 351, at least part of the moving member 350 may have a portion bent at right angles.

Meanwhile, the first and second parts 351 and 352 may be integrally formed with each other. Alternatively, the first and second parts 351 and 352 may be fabricated separate from each other and then the second part 352 may be adhered to the first part 351 by an adhesive material.

As aforementioned, the guide rail 360 is formed in the connector 200 to guide the movement of the moving member 350.

In this instance, the guide rail 360 may include a stopping portion 361 by which the second part 352 is stopped (or locked), such that the moving member 350 is movable by a predetermined stroke S1.

Although not illustrated, at a contact portion between the stopping portion 361 and the moving member 350 may be provided with a buffering portion for preventing abrasion of the moving member 350 due to friction against the stopping portion 361.

FIG. 10 illustrates a moving member and a guide rail which have different shapes from those of the moving member 350 and the guide rail 360 illustrated in FIG. 7A.

Referring to FIG. 10, a stroke S2 may be adjusted by changing a shape of at least one of the moving member 350 and the guide rail 360.

In more detail, in a state that the coupling portion 210 is inserted in the connector 200, a distance between the second part 352 and the stopping portion 361 may be adjusted by the change in the shape of the at least one of the moving member 350 and the guide rail 360. Accordingly, the stroke S1, S2 of the moving member 350 may be increased or decreased.

Meanwhile, a chamfer may be formed at at least part of the coupling portion 210, which will now be described in more detail with reference to the accompanying drawing.

Figure 11:
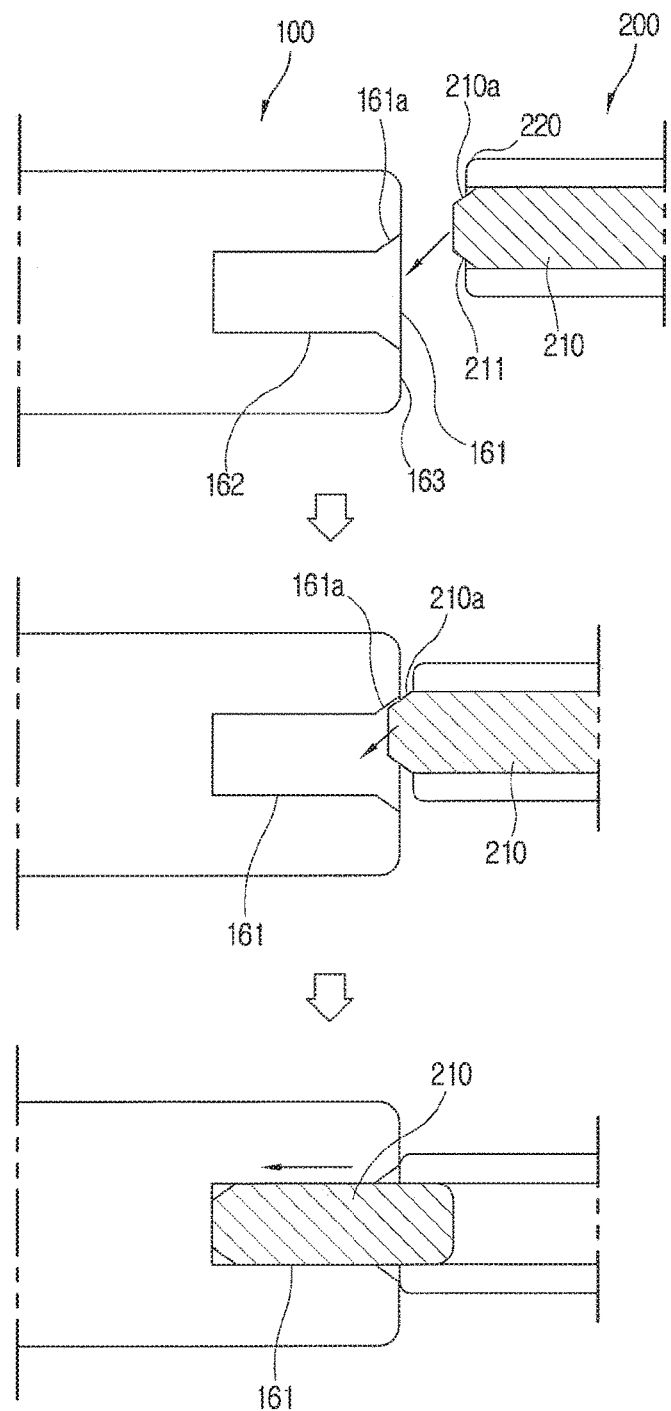
FIG. 11 is a conceptual view illustrating shapes of a coupling portion and a connection groove according to the present invention.

FIG. 11 is a conceptual view illustrating shapes of the coupling portion 210 and the connection groove 161 according to the present invention.

Referring to FIG. 11, a chamfer 210a may be formed at an end of the coupling portion 210. In general, a chamfer may refer to a portion which is formed by chamfering an edge of a member with an angular profile.

At least part of the connection groove 161 of the terminal body 100 may have a shape corresponding to the chamfer 210a.

In more detail, a portion from which the connection groove 161 is started (hereinafter, referred to as an entrance of the connection groove 161) on the one surface 163 of the terminal body 100 may have a shape corresponding to the chamfer 210a. In other words, the entrance of the connection groove 161 may have a recess portion 161a having a tilt corresponding to a tilt of the chamfer 210a.

Also, a profile of the entrance of the connection groove 161 may be greater than a profile of the socket 162.

Meanwhile, at least one of size and shape of the profile of the socket 162 may correspond to at least one of side and shape of the profile of the coupling portion 210. Accordingly, when the coupling portion 210 is inserted into the socket 162, the socket 162 may not be moved within the coupling portion 210.

Referring to sequential drawings of FIG. 11, the structure may allow the connector 200 to be coupled to the terminal body 100 by being guided by the chamfer 210a and the recess portion 161a, even though the opening 211 is moved adjacent to the terminal body 100 without facing (being aligned with) the connecting groove 161.

Meanwhile, in the present invention, at least one of the first to third magnetic members may be configured as an electromagnet. Hereinafter, various related embodiments will be described in detail with reference to the accompanying drawings.

FIGS. 12A to 12D are conceptual views illustrating various operations of the terminal body 100 and the connector 200 when a third magnetic member 341a, 341b (341) is an electromagnet according to the present invention. Also, FIGS. 13A to 13C are conceptual views illustrating various operations of the terminal body 100 and the connector 200 when a second magnetic member 331a, 331b is an electromagnet according to the present invention.

First, an electromagnet according to the present invention will be described. In this specification, an electromagnet may refer to a magnet which is magnetized when a current flows thereon, and returns to its original non-magnetized state when a current does not flow thereon. The electromagnet may have polarities whose directions change according to a current-flowing direction.

In this exemplary embodiment, as aforementioned, at least one of the first to third magnetic members may be configured as an electromagnet. In addition, the at least one magnetic member may be configured such that a current can flow in one direction thereof, in which an attractive force is generated with respect to the other magnetic members, except for the one magnetic member of the first to third magnetic members.

Figure 12A:
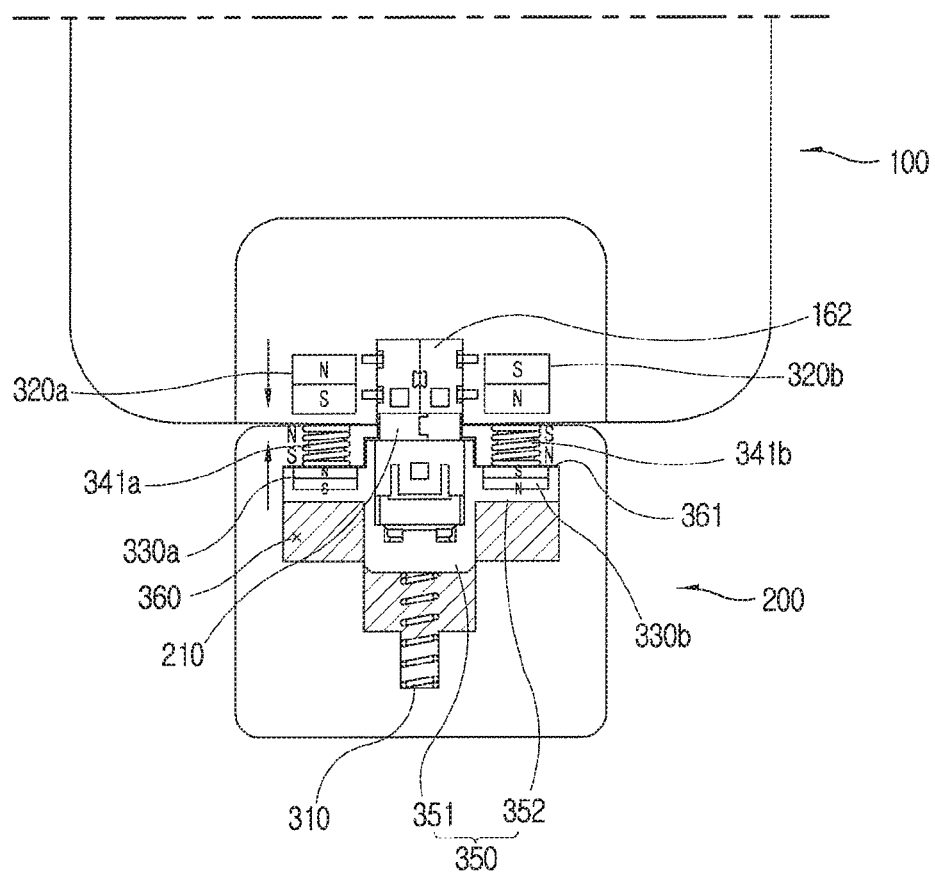
FIGS. 12A to 12D are conceptual views illustrating various operations of a terminal body and a connector when a third magnetic member is an electromagnet according to the present invention.
Figure 13A:
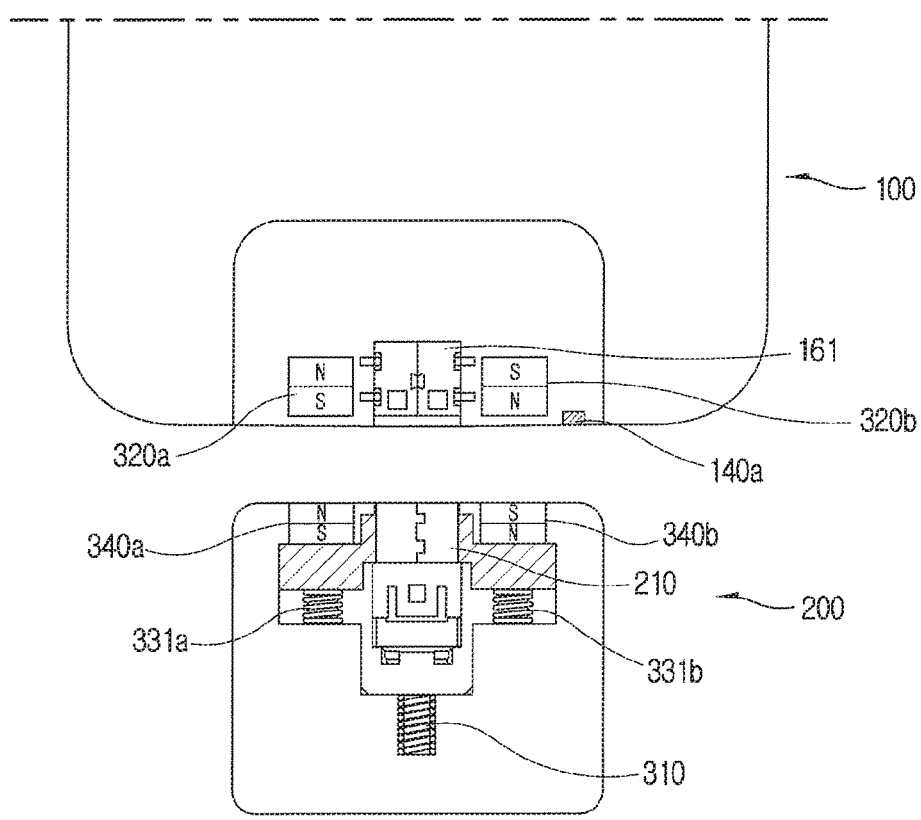
FIGS. 13A to 13C are conceptual views illustrating various operations of a terminal body and a connector when a second magnetic member is an electromagnet according to the present invention.
Figure 13B:
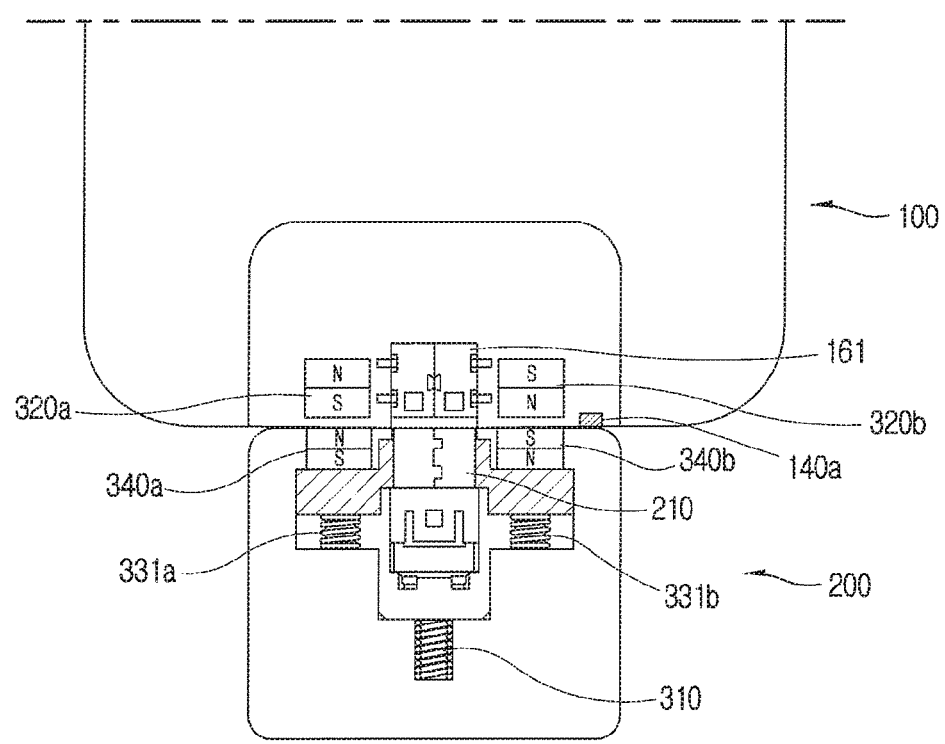
Figure 13C:
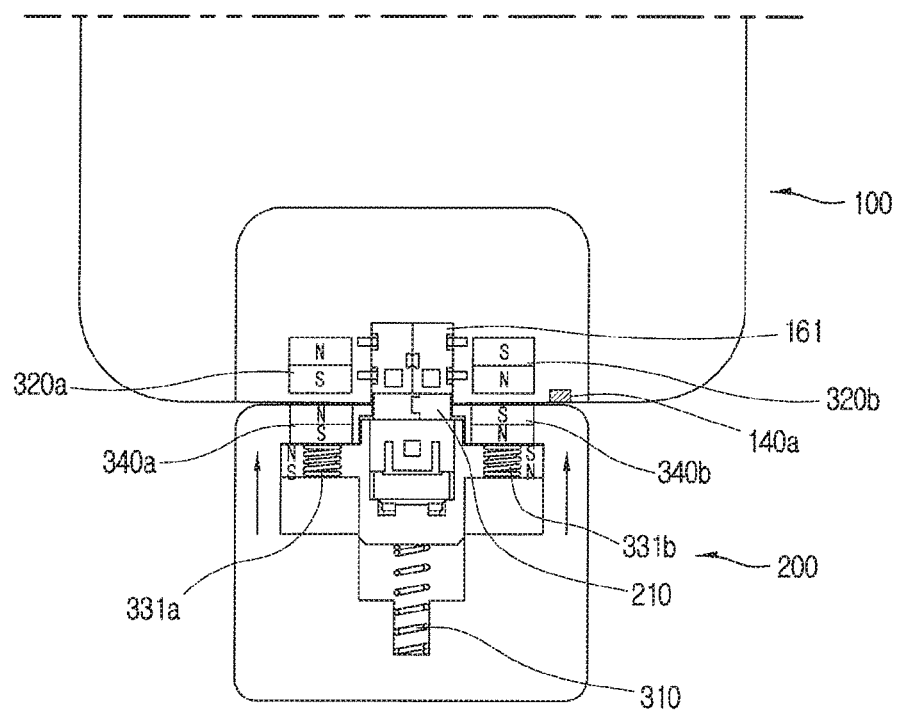

For example, referring to FIG. 12A, the third magnetic member 341a, 341b may be implemented as the electromagnet. In this instance, the third magnetic member 341a, 341b may be configured such that a current can flow thereon in one direction of generating an attractive force with respect to the first and second magnetic members 320 and 330.

The connector 200 with this structure can operate the same as the connector 200 illustrated in FIGS. 7A and 7B.

Meanwhile, in this exemplary embodiment, an example in which a charging apparatus (or charger) 400 (see FIG. 12C) is connected to the connector 200 will be described. That is, the terminal body 100 may be connected with the charger 400 through the connector 200. Here, the charger 400 may be an apparatus of supplying power to the terminal body 100, and correspond to an external battery, and the like, for example.

Figure 12B:
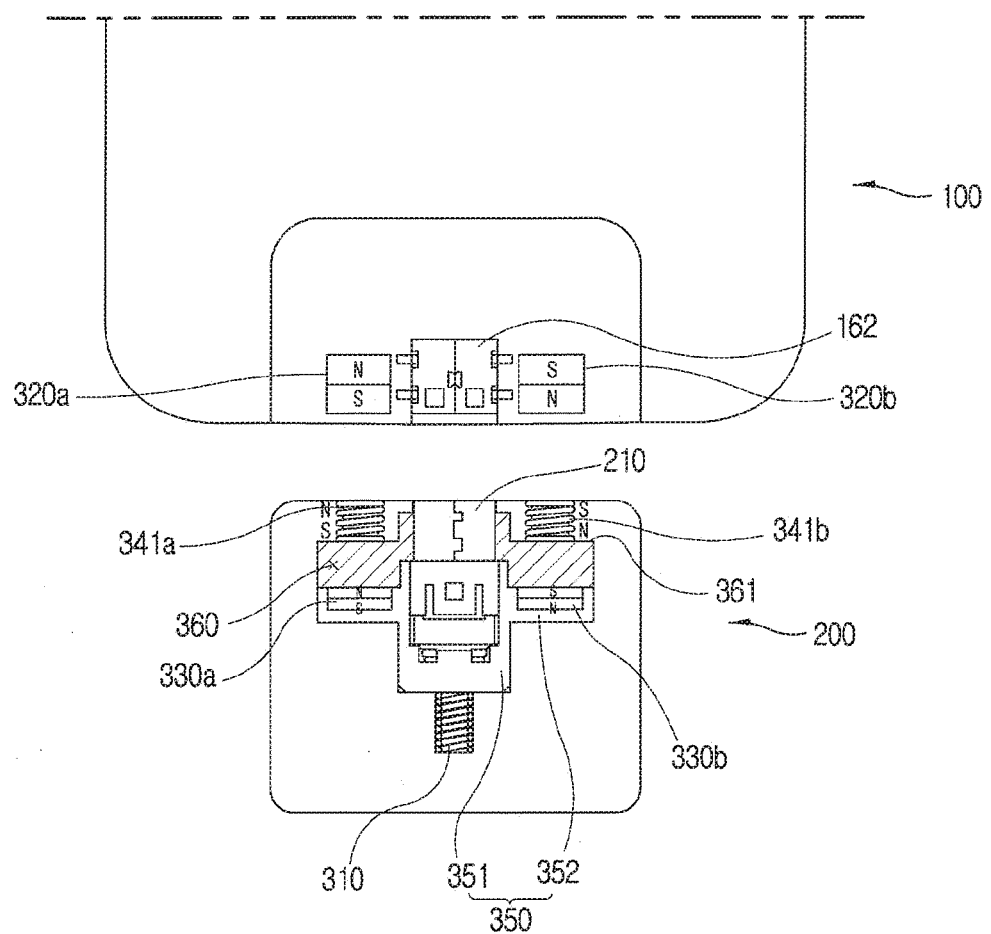

Referring to FIG. 12B, when the battery is fully charged, a current may flow on the third magnetic member 341a, 341b in an opposite direction to the one direction, to generate a repulsive force against at least one of the first and second magnetic members 320 and 330.

Accordingly, as the repulsive force is generated between the first and third magnetic members 320 and 341, the connector 200 may not be coupled to the terminal body 100 any more and be separated from the terminal body 100. Also, as the repulsive force is generated between the second and third magnetic members 330 and 341, the moving member 350 may be moved in a direction of being inserted into the connector 200. Accordingly, the coupling portion 210 can be inserted into the connector 200.

In accordance with this exemplary embodiment, when the battery charging is completed, the terminal body 100 and the connector 200 can automatically be separated from each other, without the user's forcible separation of the terminal body 100 and the connector 200. Accordingly, the battery charging may not be carried out any more, which may result in a positive influence on the lifespan of the battery.

Meanwhile, in this specification, the completely-charged state of the battery may refer to a state that a quantity of power charged in the battery is more than a reference value.

Figure 12C:
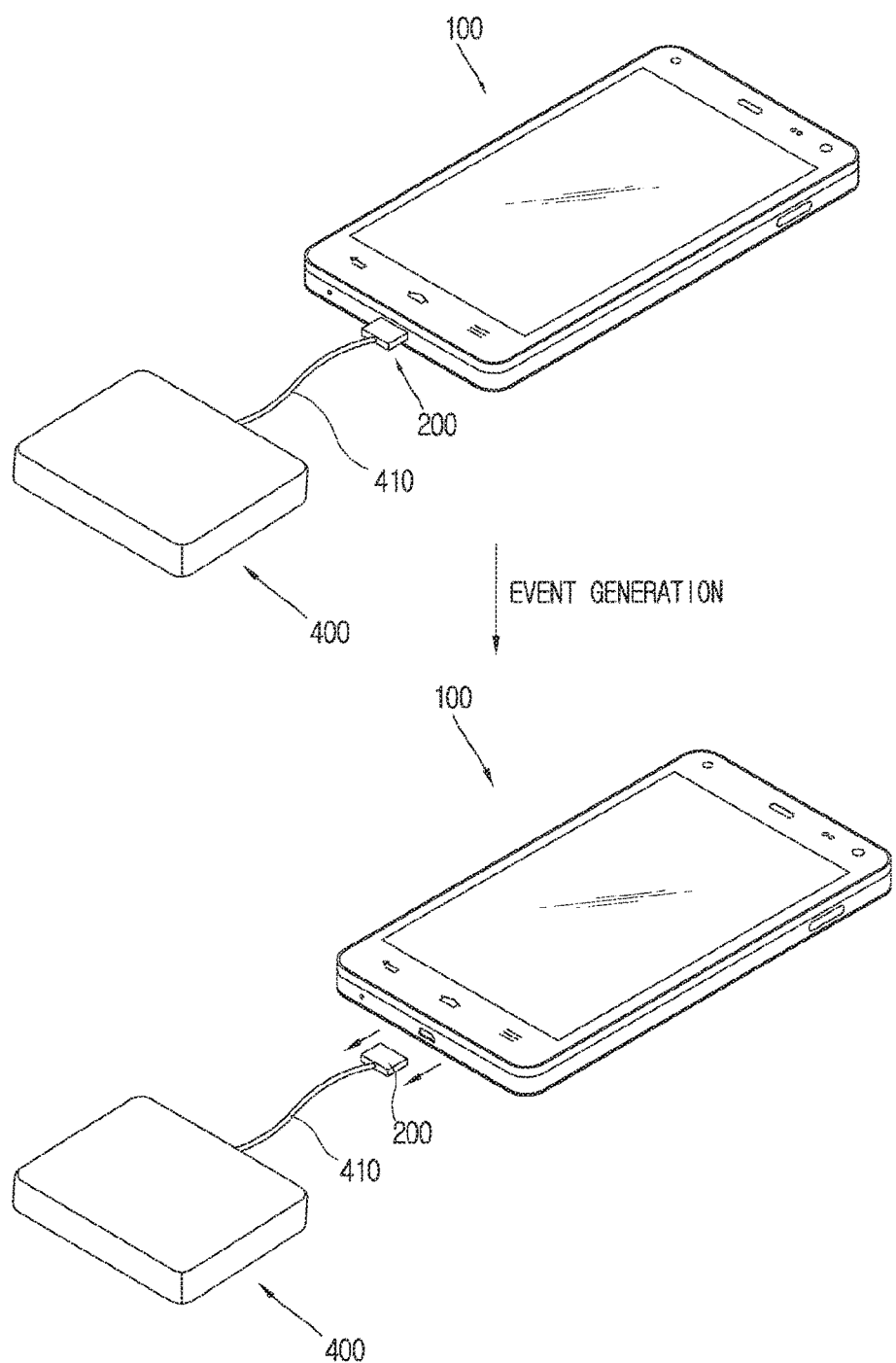

Referring to FIG. 12C, when a preset event is generated from the terminal body 100 during charging of the battery, a current may flow on the third magnetic member 341a, 341b in an opposite direction to the one direction so as to generate a repulsive force against at least one of the first and second magnetic members 320 and 330.

Here, the event generated from the terminal body 100 may refer to at least one of a message reception, a call signal reception, a missed call, a schedule notification, an email reception, an information reception through an application and the like.

In this exemplary embodiment, when an event is generated from the terminal body 100 during charging of the terminal body 100 through the connector 200, the terminal body 100 and the connector 200 may automatically be separated from each other. Accordingly, the user can check the event using the terminal body 100 more conveniently.

Meanwhile, the electromagnet may generate a magnetic force with different intensity from intensities of neighboring magnetic members, based on intensity of a current flowing thereon. In addition, the intensity of the current flowing on the electromagnet may change based on a user selection.

Figure 12D:
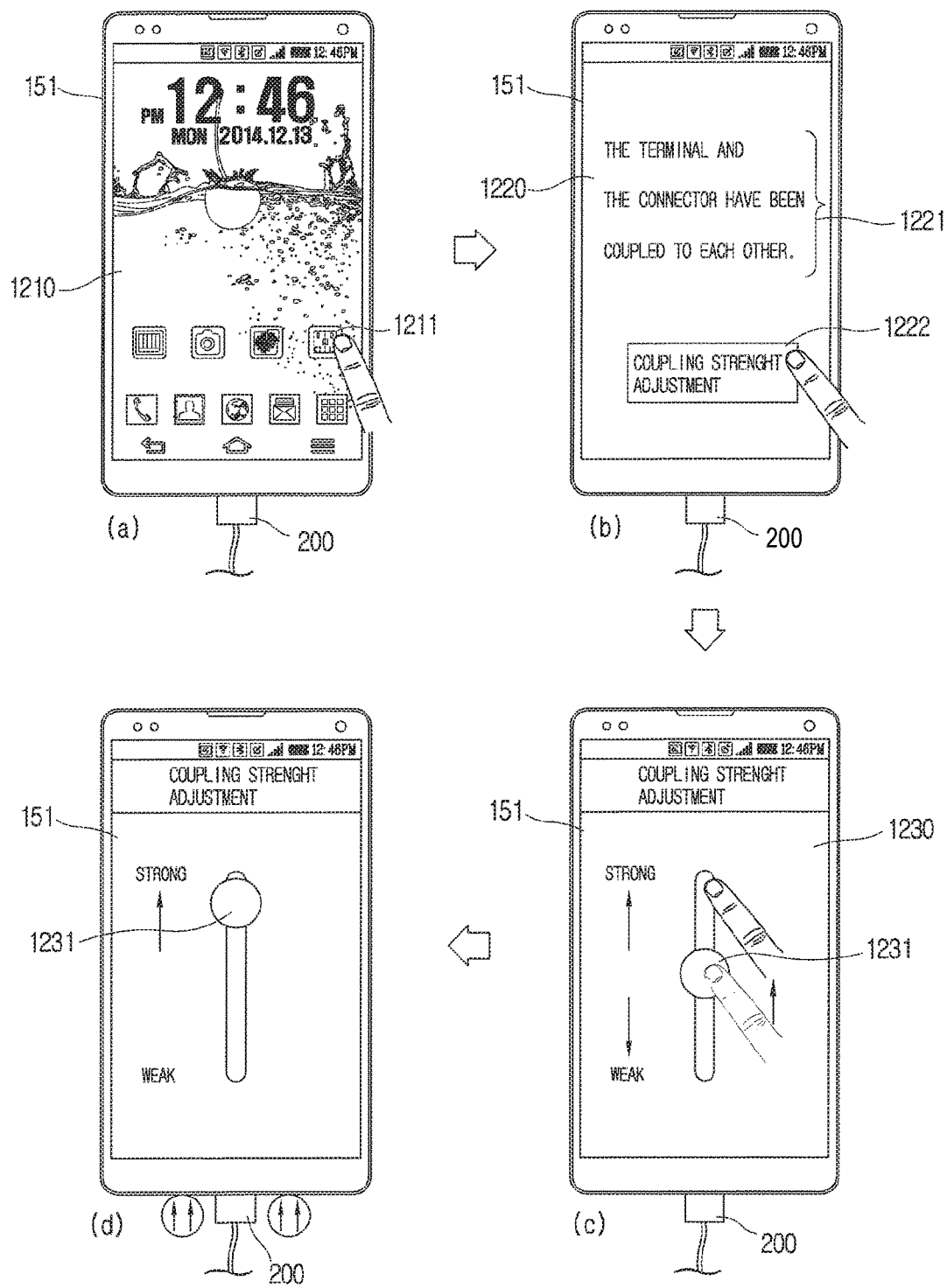

Referring to (a) of FIG. 12D, the terminal body 100 may be provided with applications preinstalled therein to control various operations of the connector 200 according to the present invention. A home screen output on the display unit 151 may include icons 1211 corresponding to the applications.

Referring to (a) and (b) of FIG. 12D, a controller according to the present invention may output a first control screen 1220 of the connector 200 on the display unit 151 when a user request for starting a control of the operation of the controller 200 is input.

Referring to (b) of FIG. 12D, the first control screen 1220 of the connector 200 may output thereon information 1221 related to a sensing result as to whether or not the terminal body 100 and the connector 200 have been coupled to each other. The first control screen 1220 may also include a virtual icon 1222 involved in an adjustment of a coupling strength (or a coupled degree) between the terminal body 100 and the connector 200.

Referring to (b) and (c) of FIG. 12D, when an input is applied to the virtual icon 1222, the controller may control the display unit 151 to output a second control screen 1230 for adjusting the coupling strength between the terminal body 100 and the connector 200.

Referring to (c) and (d) of FIG. 12D, the second control screen 1230 may include a coupling strength adjusting bar 1231. The controller may set the coupling strength between the connector 200 and the terminal body 100 based on a preset touch applied to the coupling strength adjusting bar 1231. In addition, the controller may control intensity of a current flowing on the electromagnet based on the set coupling strength.

In this exemplary embodiment, by adjusting intensity of a current of the electromagnet included in the moving module, the terminal body 100 and the connector 200 can be coupled to each other strong enough to meet the user's desire. This may allow for adjusting the coupling strength between the terminal body 100 and the connector 200 under various environments.

The foregoing description has been given of various embodiments related to the detachable or attachable structure between the terminal body 100 and the connector 200 when the third magnetic member 341a, 341b is configured as the electromagnet.

Although not illustrated separately, even when the first magnetic member other than the third magnetic member is configured as the electromagnet, those various embodiments can also be applied as they are.

Hereinafter, description will be given of various embodiments related to a case where the second magnetic member 331a, 331b movable by the moving module is configured as an electromagnet, with reference to FIGS. 13A to 13C.

In accordance with this exemplary embodiment, the terminal body 100 or the connector 200 may be provided with a sensor unit 140a for sensing whether or not the terminal body 100 and the connector 200 are coupled to each other.

In more detail, when the sensor unit 140a is provided in the terminal body 100, the sensor unit 140a may be disposed adjacent to one surface with the connection groove 161 of the terminal body 100. Alternatively, when the sensor unit 140a is disposed in the connector 200, the sensor unit 140a may be disposed adjacent to one surface with the opening 211 of the connector 200.

The sensor unit 140a may include one of a hall IC sensor, a proximity sensor, an illumination sensor and the like.

In more detail, the hall IC sensor may be configured to detect a surrounding magnetic field. When the sensor unit 140a includes the hall IC sensor, if the hall IC sensor detects a change in a magnetic field which is generated when the terminal body 100 and the connector 200 are changed from a separated state into a coupled state, it may be determined that the terminal body 100 and the connector 200 have been coupled to each other.

Alternatively, the proximity sensor may detect whether or not the terminal body 100 and the connector 200 are coupled to each other, based on an approached degree between the terminal body 100 and the connector 200.

Alternatively, the illumination sensor may detect that the terminal body 100 and the connector 200 have been coupled to each other when a change in illumination which is generated when the terminal body 100 and the connector 200 are coupled to each other is detected.

Meanwhile, the sensor unit 140a may be implemented as various sensors, other than the aforementioned sensors.

The controller according to the present invention may control the second magnetic member 331a, 331b, based on the sensing result of the sensor unit 140a, such that a current can start to flow on the second magnetic member 331a, 331b.

In more detail, referring to FIG. 13A, when the separate state between the terminal body 100 and the connector 200 is detected by the sensor unit 140a, the controller may control the second magnetic members 331a and 331b such that a current cannot flow on the second magnetic members 331a and 331b.

Accordingly, only an elastic force may be applied to the moving member 350 (or coupling portion 210), which may allow the coupling portion 210 to be kept inserted in the connector 200.

Referring to FIG. 13B, when the connector 200 is located adjacent to the terminal body 100, the connector 200 may be coupled to the terminal body 100 by the attractive force between the first and third magnetic members 320 and 340.

Referring to FIG. 13C, when the coupled state between the terminal body and the connector 200 is detected by the sensor unit 140a, the controller may control the second magnetic member 331a, 331b such that a current starts to flow on the second magnetic member 331a, 331b.

In more detail, the controller may control the second magnetic member 331a, 331b such that the current flows on the second magnetic member 331a, ad 331b in one direction of generating an attractive force with at least one of the first and second third members 320 and 340.

According to this exemplary embodiment, after the connector 200 is coupled to the terminal body 100, the insertion of the coupling portion 210 into the socket 162 can be controlled more accurately.

According to one exemplary embodiment disclosed herein, in a state that a coupling portion is inserted in a connector by an elastic force, when the connector is moved to a position adjacent to a socket, the connector may be coupled to a terminal body and accordingly the coupling portion can be inserted into the socket.

This may allow the coupling portion to be inserted into the socket more accurately, once the connector is located adjacent to the terminal body, without inconvenience in that a user has to insert the coupling portion into the socket with separately checking positions of a connection groove and an opening.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a terminal body having a socket;
    a connector having an opening and a coupling portion configured to be coupled to the socket through the opening; and
    a moving module configured to move the coupling portion so as to be drawn out of or drawn into the connector through the opening, the moving module including:
        a first magnetic member at the terminal body;
        a second magnetic member at the coupling portion and configured to generate a first magnetic force with the first magnetic member, so as to apply a force to the coupling portion in a direction that the coupling portion is drawn out of the connector; and
        a third magnetic member disposed at one surface of the connector having the opening, the third magnetic member being configured to generate a second magnetic force with at least one of the first and second magnetic members.

2. The terminal of claim 1, wherein the first magnetic member is disposed within the terminal body at a position adjacent to one surface of the terminal body having the socket, and
    wherein the second magnetic member is disposed within the connector at a position opposite the first magnetic member when the coupling portion is opposite the socket.

3. The terminal of claim 1, wherein the moving module further comprises an elastic member disposed in the connector, the elastic member being configured to apply an elastic force to the coupling portion in a direction that the coupling portion is drawn into the connector.

4. The terminal of claim 3, wherein, when the connector is moved to a position adjacent to the socket, the first magnetic force increases in strength to be greater than the elastic force such that the coupling portion is inserted into the socket when the connector is moved to the position adjacent to the socket.

5. The terminal of claim 3, wherein the second magnetic force is generated by the third magnetic member and the second magnetic member, the second magnetic force being smaller than the elastic force such that the coupling portion is drawn into the connector when the connector is not located adjacent to the terminal body.

6. The terminal of claim 1, wherein, when the connector is moved to a position adjacent to the socket, the third magnetic member is disposed at the one surface of the connector to face the first magnetic member such that the opening is located at a position corresponding to the socket.

7. The terminal of claim 1, wherein the first and third magnetic members are provided in plurality, respectively,
    wherein at least two of the first magnetic members are disposed on one surface of the terminal body having the socket, and the socket is located between the at least two of the first magnetic members, and
    wherein at least two of the third magnetic members are disposed on the one surface of the connector with the opening, and the opening is located between the at least two of the third magnetic members.

8. The terminal of claim 7, wherein the plurality of first magnetic members are arranged along the one surface of the terminal body to have first and second polarities in an alternating manner, and
    wherein the plurality of third magnetic members are arranged along the one surface of the connector to have second and first polarities in an alternating manner so as to generate attractive forces with the plurality of first magnetic members, respectively.

9. The terminal of claim 1, wherein, when the connector is coupled to the terminal body, the third magnetic member is located between the first magnetic member and the second magnetic member such that the first to third magnetic members are arranged along a same line.

10. The terminal of claim 1, wherein at least one of the first to third magnetic members is configured as an electromagnet having a polarity that is changeable according to a flowing direction of a current, and
    wherein the at least one of the first to third magnetic members is configured such that a current flows thereon in one direction to generate an attractive force with the remaining magnetic members of the first to third magnetic members.

11. The terminal of claim 10, wherein the terminal body is provided with a battery, and
    wherein, when the battery is fully charged, the at least one of the first to third magnetic members is configured such that a current flows thereon in an opposite direction to the one direction to generate a repulsive force against the remaining magnetic members of the first to third magnetic members.

12. The terminal of claim 11, wherein, when a preset event is generated from the terminal body during charging of the battery, the at least one of the first to third magnetic members is configured such that a current flows in the opposite direction to the one direction to generate a repulsive force against the remaining magnetic members of the first to third magnetic members.

13. The terminal of claim 10, further comprising a controller configured to control the at least one of the first to third magnetic members such that an intensity of the flowing current is adjusted based on a user selection.

14. The terminal of claim 10, further comprising:
    a sensor on one surface of the terminal body having the socket or the one surface of the connector, the sensor being configured to detect a coupled state between the terminal body and the connector; and
    a controller configured to control the at least one of the first to third magnetic members such that the current starts to flow on the at least one of the first to third magnetic members based on the detected coupled state.

15. The terminal of claim 3, wherein the moving module further comprises a moving member configured to be movable along a guide rail disposed in the connector, and
    wherein the coupling portion and the second magnetic member are coupled to the moving member so as to be movable along with the moving member.

16. The terminal of claim 15, wherein the moving member comprises:
    a first part having the coupling portion coupled thereto; and a second part protruding from the first part and having the second magnetic member coupled thereto.

17. The terminal of claim 16, wherein the guide rail comprises a stopping portion configured to stop the second part such that the moving member has a predetermined stroke.

18. The terminal of claim 1, wherein the coupling portion is provided with a chamfer formed at an end thereof.

19. The terminal of claim 18, further comprising a connection groove formed at one surface of the terminal body, the connection groove having a portion configured to cooperate with the chamfer of the coupling portion to guide the coupling portion.

20. The terminal of claim 19, wherein the connection groove has a profile greater than that of the socket.

21. The terminal of claim 1, wherein the connector is a charging connector for supplying power to the terminal body.

* * * * *